US009505197B2

(12) United States Patent
Umemoto et al.

(10) Patent No.: US 9,505,197 B2
(45) Date of Patent: *Nov. 29, 2016

(54) MATERIAL ROLL AND SYSTEM AND METHOD FOR MANUFACTURING OPTICAL DISPLAY DEVICE

(75) Inventors: Seiji Umemoto, Ibaraki (JP); Satoshi Hirata, Ibaraki (JP); Takuya Nakazono, Ibaraki (JP); Kentarou Takeda, Ibaraki (JP); Michihito Ooishi, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/028,770

(22) Filed: Feb. 16, 2011

(65) Prior Publication Data

US 2012/0031552 A1 Feb. 9, 2012

(30) Foreign Application Priority Data

Aug. 5, 2010 (JP) ................................. 2010-176589

(51) Int. Cl.
 *B32B 7/06* (2006.01)
 *B32B 33/00* (2006.01)
 (Continued)

(52) U.S. Cl.
 CPC ................. *B32B 33/00* (2013.01); *B32B 7/06* (2013.01); *B32B 27/36* (2013.01); *B32B 37/12* (2013.01);
 (Continued)

(58) Field of Classification Search
 CPC ..... B32B 7/06; B32B 33/00; B32B 2367/00; B32B 2457/202
 USPC ................. 156/250, 252, 253, 256
 See application file for complete search history.

(56) References Cited

U.S. PATENT DOCUMENTS 7,279,060 B2 * 10/2007 Chen et al. .................... 156/230
7,658,922 B2 * 2/2010 Yarnall et al. .............. 424/141.1
(Continued)

FOREIGN PATENT DOCUMENTS

EP 2289698 A1 3/2011
JP 55-117110 * 9/1980
(Continued)

OTHER PUBLICATIONS

Korean Office Action dated Apr. 11, 2011, issue in corresponding Korean patent Application No. 10-2011-0003927.
(Continued)

*Primary Examiner* — Mark A Osele
*Assistant Examiner* — Christopher C Caillouet
(74) *Attorney, Agent, or Firm* — Westerman, Hattori, Daniels & Adrian, LLP

(57) ABSTRACT

Provided are a system and a method for manufacturing an optical display device and a material roll, which can effectively prevent the production of defective optical display devices even in a process including drawing a long sheet material from a material roll and bonding an optical film to an optical display unit, and which is a roll of a laminate of a first base film, a first pressure-sensitive adhesive layer, an optical film, a second pressure-sensitive adhesive layer, and a second base film, which are wound in the roll in this order from the outside, and has a width corresponding to the length of any one side of a rectangular optical display unit, wherein the adhering strength A of the first base film-side interface of the first pressure-sensitive adhesive layer, the adhering strength B of the optical film-side interface of the first pressure-sensitive adhesive layer, the adhering strength C of the optical film-side interface of the second pressure-sensitive adhesive layer, and the adhering strength D of the second base film-side interface of the second pressure-sensitive adhesive layer satisfy the relations A<B and A<C<D.

8 Claims, 9 Drawing Sheets

(51) Int. Cl.
*B32B 27/36* (2006.01)
*B32B 37/12* (2006.01)

(52) U.S. Cl.
CPC ...... *B32B 2367/00* (2013.01); *B32B 2457/202* (2013.01); *Y10T 156/1062* (2015.01); *Y10T 156/12* (2015.01); *Y10T 428/1476* (2015.01)

(56) References Cited

U.S. PATENT DOCUMENTS

| | | |
|---|---|---|
| 2007/0231548 A1 | 10/2007 | Merrill et al. |
| 2009/0159175 A1 | 6/2009 | Nakahira et al. |
| 2009/0260738 A1 | 10/2009 | Kitada et al. |
| 2009/0263608 A1 | 10/2009 | Kitada et al. |
| 2010/0186890 A1 | 7/2010 | Kitada et al. |
| 2010/0206977 A1 | 8/2010 | Kitada et al. |
| 2010/0212822 A1 | 8/2010 | Kitada et al. |
| 2010/0258250 A1 | 10/2010 | Kitada et al. |
| 2010/0282406 A1 | 11/2010 | Kitada et al. |
| 2010/0288432 A1 | 11/2010 | Kitada et al. |
| 2010/0300606 A1 | 12/2010 | Kitada et al. |
| 2011/0059327 A1* | 3/2011 | Takeda et al. ............ 428/480 |
| 2011/0061801 A1 | 3/2011 | Kitada et al. |
| 2011/0126988 A1 | 6/2011 | Kitada et al. |

FOREIGN PATENT DOCUMENTS

| | | |
|---|---|---|
| JP | 57-052017 A | 3/1982 |
| JP | 2001-108981 A | 4/2001 |
| JP | 2001-108982 A | 4/2001 |
| JP | 2002-019039 A | 1/2002 |
| JP | 2002-303730 A | 10/2002 |
| JP | 2003-025473 A | 1/2003 |
| JP | 2007-140046 A | 6/2007 |
| JP | 4307510 B1 | 8/2009 |
| JP | 2009-532723 A | 9/2009 |
| JP | WO 2009084370 * | 9/2009 |
| JP | 2009-276755 A | 11/2009 |
| JP | 2010188550 A * | 9/2010 |
| KR | 10-2003-7003232 A | 3/2003 |
| TW | 520452 B | 2/2003 |
| TW | 201005334 A1 | 2/2010 |
| WO | 2009-087895 A1 | 7/2009 |

OTHER PUBLICATIONS

European Search Report dated Jun. 10, 2011, issued in corresponding European Patent Application No. 11157690.6.
Taiwanese Office Action dated Jul. 22, 2011, issued in corresponding Taiwanese Patent Application No. 099135468.
European Office Action dated Sep. 24, 2012, issued in corresponding European Patent Application No. 11 157 690.6, (5 pages).
European Office Action dated Mar. 27, 2013, issued in corresponding European Patent Application No. 11 157 690.6.
Chinese Office Action dated Nov. 5, 2013, issued in corresponding Chinese Patent Application No. 201110070307.5, w/ English translation.

* cited by examiner

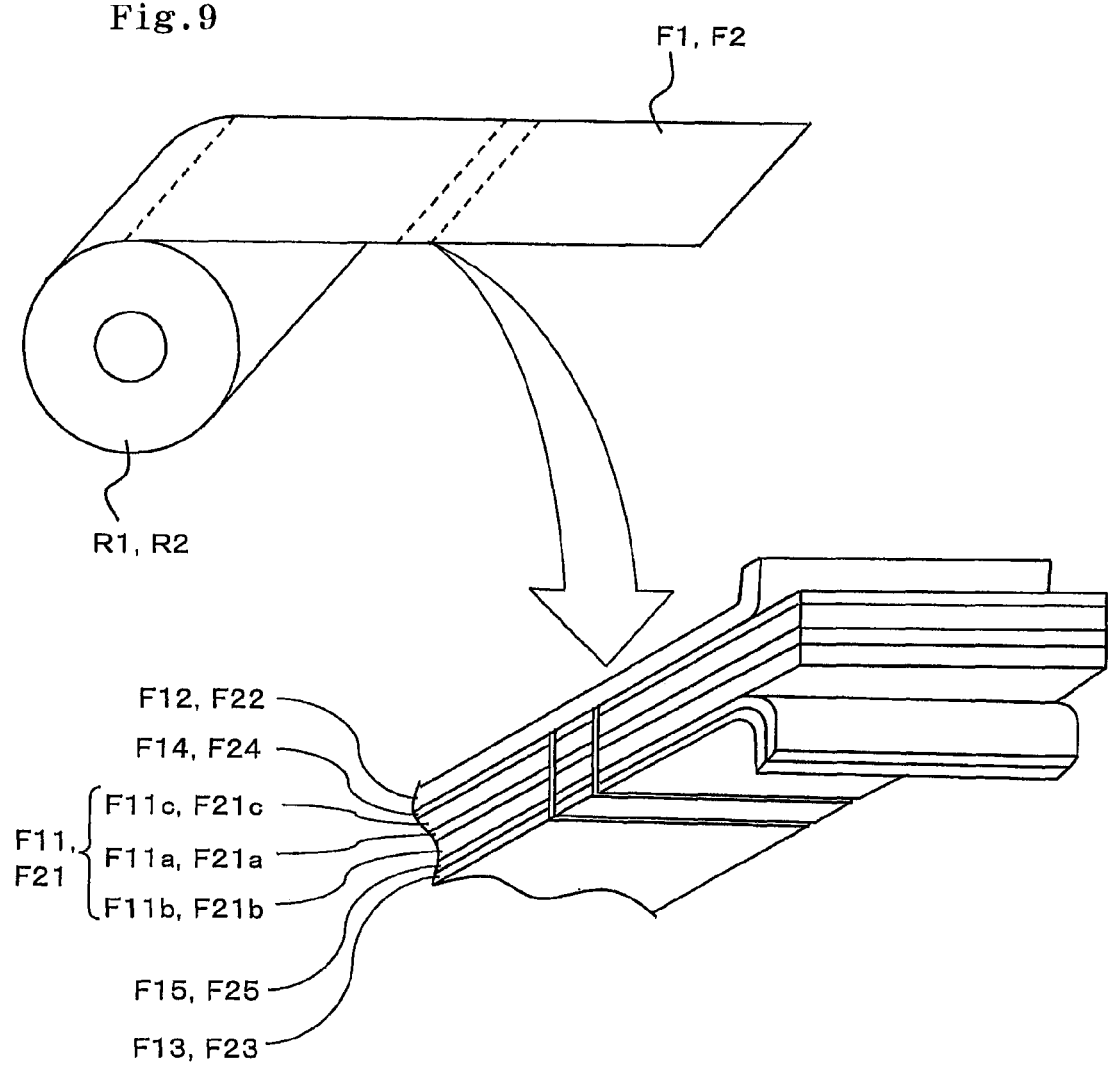

MATERIAL ROLL AND SYSTEM AND METHOD FOR MANUFACTURING OPTICAL DISPLAY DEVICE

BACKGROUND OF THE INVENTION

Field of the Invention

The invention relates to a material roll which includes a roll of a long sheet material including an optical film having first and second surfaces, a first base film provided on the first surface of the optical film with a first pressure-sensitive adhesive layer interposed therebetween, and a second base film provided on the second surface of the optical film with a second pressure-sensitive adhesive layer interposed therebetween and which is for use in a process comprising drawing the long sheet material from the roll, cutting at least the optical film into a predetermined length, and bonding the cut piece of the optical film to the surface of an optical display unit. The invention also relates to a system and a method for manufacturing an optical display device with the material roll.

Description of the Related Art

An example of the optical display device, which is incorporated in a liquid crystal display or the like, has a structure including an optical display unit and optical sheet pieces (including an optical film such as a polarizing film) bonded to one or both sides of the optical display unit. A known conventional method for manufacturing such an optical display device includes the steps of providing a roll of a long sheet material including an optical film and a release film (a first base film) bonded thereto, drawing the long sheet material from the roll, sequentially cutting the long sheet material in the transverse direction at intervals corresponding to the size of an optical display unit so that a cut piece of the sheet material is obtained, then peeling off the first base film from the cut piece of the sheet material to obtain an optical sheet piece having a first pressure-sensitive adhesive layer at the surface, and bonding the optical sheet piece to the optical display unit with the first pressure-sensitive adhesive layer interposed therebetween. Since the first base film is peeled off so that the optical sheet piece can be bonded to the optical display unit, the first base film is so formed that it can be relatively easily peeled off.

In the above conventional method of manufacturing an optical display unit, each manufactured piece of the sheet material is packaged by a film manufacturer and transported to a panel manufacturer, who unpacks each piece and bonds it to each optical display unit. The packaging is necessary, because the film manufacturer and the panel manufacturer are located at different places. However, the packaging is complicated and causes a problem in which the pieces of the sheet material may easily suffer from scratching or staining during transport or the like.

The technique disclosed in Japanese Patent Application Laid-Open (JP-A) No. 2007-140046 uses a continuous manufacturing line in which the steps of cutting a long sheet material drawn from a material roll and bonding the cut piece of the sheet material to an optical display unit are performed. This can make the process simpler than the conventional method including packaging each piece of the sheet material and prevent scratching or staining during transport or the like.

Even in the technique disclosed in Japanese Patent Application Laid-Open (JP-A) No. 140046, the roll of the long sheet material has to be transported from a film manufacture to a panel manufacturer. Since only a little or stain can make defective an optical film such as a polarizing film in the long sheet material, a surface protecting film is bonded to the optical film so that the optical film can be protected from scratching or staining during transport or until the optical film is bonded to the optical display unit.

The surface protecting film corresponds to a second base film, which is peelably bonded to the surface of the optical film with a second pressure-sensitive adhesive layer interposed therebetween and will be peeled off together with the second pressure-sensitive adhesive layer after the optical sheet piece is bonded to the optical display unit. Since the second base film is peeled off from the optical film after the optical sheet piece is bonded to the optical display unit, the second pressure-sensitive adhesive layer is so formed that it can be relatively easily peeled off from the optical film.

As mentioned above, the first and second base films are so formed that they can be relatively easily peeled off. If the material roll is formed by winding a long sheet material in which such easily peelable base films are laminated, respectively, stress generated between each base film and the optical film may cause displacement between these films. In such a case, lifting may occur between each base film and the optical film, which may result in bubbles or wrinkles.

There is a problem in which if bubbles or wrinkles are formed between each base film and the optical film, the surface of the pressure-sensitive adhesive layer may be damaged, so that a defective product may be produced. In particular, there is a problem in which if such a material roll is placed in a high-temperature environment for a long time during transport or exposed to a shake, vibration, impact, or the like during transport, lifting may tend to occur between each base film and the optical film, so that the durability of the material roll may be reduced. If lifting occurs between each base film and the optical film, the thickness of the pressure-sensitive adhesive layer may be changed at the part where the lifting occurs, and the optical film wound in such a state may be deformed.

Such lifting can be a significant problem in a continuous process including drawing the long sheet material from the material roll and bonding the optical film to the optical display unit. Specifically, during the process from the step of drawing the long sheet material from the material roll to the step of bonding the optical film to the optical display unit, it is difficult to visually detect lifting generated in the long sheet material or treat the lifting as a defect. Even if defect inspection is automatically performed using a defect inspection apparatus, it will be difficult to reliably detect lifting with no false detection in the defect inspection apparatus. Thus, there is a problem in which an optical film deformed by lifting may be bonded to the optical display unit to form a defective optical display device.

SUMMARY OF THE INVENTION

The invention has been made under such circumstances, and it is an object of the invention to provide a material roll which can more effectively prevent the production of defective optical display devices even in a process including drawing a long sheet material from a material roll and bonding an optical film to an optical display unit, and to provide a system and a method for manufacturing an optical display device.

As a result of a study of the problems, the inventors have found that the lifting between films can be prevented by controlling the relationship between the adhering strength of the pressure-sensitive adhesive layer interposed between the base film and the optical film and the direction in which the films are wound.

A material roll of the present invention is a material roll, for use in a process of drawing a long sheet material from a roll, cutting at least an optical film into a predetermined length, and bonding a cut piece of the optical film to a surface of a rectangular optical display unit, comprising a roll of the long sheet material comprising the optical film having first and second surfaces, a first base film provided on the first surface of the optical film with a first pressure-sensitive adhesive layer interposed therebetween, and a second base film provided on the second surface of the optical film with a second pressure-sensitive adhesive layer interposed therebetween, wherein the long sheet material has a width corresponding to the length of any one side of the optical display unit, the adhering strengths A, B, C, and D satisfy the relation A<B and the relation A<C<D, when the first pressure-sensitive adhesive layer has a first base film-side interface with an adhering strength A, the first pressure-sensitive adhesive layer has an optical film-side interface with an adhering strength B, the second pressure-sensitive adhesive layer has an optical film-side interface with an adhering strength C, and the second pressure-sensitive adhesive layer has an second base film-side interface with an adhering strength D, and the long sheet material is wound in such a manner that the first base film is located on an outer side and that the second base film is located on an inner side.

Such a feature makes it possible to provide a material roll in which the first base film, the first pressure-sensitive adhesive layer, the optical film, the second pressure-sensitive adhesive layer, and the second base film are wound in this order from the outside and wound into the roll. In such a material roll, stress in the contraction direction acts on an inner part thereof, while stress in the tensile direction acts on an outer part thereof. Thus, lifting is less likely to occur at the interface between the first base film and the first pressure-sensitive adhesive layer, on which stress in the tensile direction acts, while lifting is more likely to occur at the interface between the first pressure-sensitive adhesive layer and the optical film, on which stress in the contraction direction acts. According to the invention, however, the adhering strength A of the first base film-side interface of the first pressure-sensitive adhesive layer is set greater than the adhering strength B of the optical film-side interface of the first pressure-sensitive adhesive layer, so that lifting is suppressed between the first base film and the optical film.

In a high-temperature environment, the first base film, the first pressure-sensitive adhesive layer, the optical film, the second pressure-sensitive adhesive layer, and the second base film themselves shrink, respectively, and therefore, greater stress in the shrinkage direction acts on the second base film, which is located on the inner side, so that lifting is more likely to occur between the second base film and the optical film. According to the invention, however, the adhering strengths C and D of the second pressure-sensitive adhesive layer are set greater than the adhering strength A of the first base film-side interface of the first pressure-sensitive adhesive layer, and the optical film is wound into the roll in such a manner that the second base film side with such a greater adhering strength is located on the inner side, so that lifting is suppressed between the second base film and the optical film, which makes it possible to improve the durability in a high-temperature environment.

Particularly, if lifting occurs in the long sheet material in a continuous process including drawing the long sheet material from the material role and bonding the optical film to the optical display unit, a defective optical display may be obtained. According to the invention, however, lifting is less likely to occur in the long sheet material, so that the production of defective optical display devices can be more effectively prevented.

When the width of the long sheet material corresponds to any one side of the rectangular optical display unit, the long sheet material is required to have no lifting along its entire width. According to the invention, the long sheet material resists lifting along its entire width, so that the production of defective optical display devices can be more effectively prevented even when the width of the long sheet material corresponds to any one side of the rectangular optical display unit.

The material roll of the invention is also formed so that the first pressure-sensitive adhesive layer can be left on the optical film when the first base film is peeled off. Therefore, in the continuous process including drawing the long sheet material from the material roll and bonding the optical film to the optical display unit, the first base film can be used as a release film (separator). Specifically, the material roll of the invention has a structure in which the long sheet material is wound into the roll in such a manner that the release film is located on the outer side. In this case, the optical film has a tendency to curl, at the ends, away from the optical display unit in the bonding process. Therefore, when the optical film and the optical display unit are fed between a pair of rolls and bonded together, the ends of the optical film do not come into contact with the optical display unit before it arrives at the intended feed position, so that the optical film does not get stuck and can be bonded stably. The tendency to curl is particularly preferred when the optical film is bonded from the upper side to the optical display unit. The tendency to curl also provides the advantage that the ends of the optical film can be easily separated from the first base film.

It is preferred that the adhering strengths B and C satisfy the relation B>C.

According to such a feature, the second pressure-sensitive adhesive layer can be reliably peeled off together with the second base film, when the second base film is peeled off from the optical film after the optical film is bonded to the optical display unit.

The long sheet material may be obtained by a slitting process comprising slitting a long material in a direction parallel to its longitudinal direction into a width corresponding to the length of any one side of the optical display unit, while unwinding the long material.

Such a feature makes it possible to easily manufacture a material roll of a long sheet material having a width corresponding to the length of any one side of an optical display unit.

The optical film in the long material may comprise a polarizing film, and the long material can have a longitudinal direction parallel to an absorption axis of the polarizing film.

According such a feature, the absorption axis of the polarizing film in the optical film can be made, with high accuracy, parallel to the longitudinal direction of the long sheet material obtained through a slitting process. In the bonding process, therefore, the absorption axis can be made, with high accuracy, parallel to any one side of the optical display unit, so that an optical display device of higher quality can be manufactured.

The above material roll may be used in a process comprising bonding the optical film to the surface of the optical display unit, while peeling off the optical film and the second base film from the first base film.

As stated above, the optical film is bonded to the surface of the optical display unit, while the optical film and the second base film are peeled off from the first base film. In this process, if the optical film and the second base film are not easy to peel off from the first base film, the optical film and the second base film can be pulled toward the first base film during the peeling off step, so that the bonding may not be successfully performed. According to the invention, however, the adhering strength A can be made relatively low, because the long sheet material resists lifting. Therefore, the optical film and the second base film can be easily peeled off from the first base film, so that the bonding can be successfully performed, which can prevent more effectively the production of defective optical display devices.

In this case, the adhering strength A may be from 0.075 N/25 mm to 0.4 N/25 mm.

According to the invention, lifting in the long sheet material can be more effectively prevented, even when the adhering strength A is from 0.075 to 0.4 N/25 mm. Therefore, the optical film and the second base film can be easily peeled off from the first base film, and lifting is less likely to occur in the long sheet material, so that the bonding can be successfully performed and the production of defective optical display devices can be more effectively prevented.

The other part of the long sheet material than the first base film can have a thickness of 50 μm to 200 μm.

When the other part of the long sheet material than the first base film is thin, the part other than the first base film is not so elastic, and therefore, the adhering strength A should be made relatively low so that the part can be successfully peeled off from the first base film. According to the invention, the adhering strength A can be made relatively low, because the long sheet material resists lifting. Therefore, even when the part other than the first base film is as thin as 50 to 200 μm, the part can be successfully peeled off from the first base film, and the long sheet material can be effectively prevented from suffering from lifting, which makes it possible to successfully perform the bonding and to more effectively prevent the production of defective optical display devices.

In this case, the adhering strength A may be from 0.01 N/25 mm to 0.19 N/25 mm.

When the part other than the first base film is as thin as 50 to 200 μm, the long sheet material can be effectively prevented from suffering from lifting even with the adhering strength A being from 0.01 to 0.19 N/25 mm. With such a smaller adhering strength A, the part other than the first base film can be more easily peeled off from the first base film, so that the bonding can be more successfully performed and that the production of defective optical display devices can be more effectively prevented.

A system for manufacturing an optical display device of the present invention is a system for manufacturing an optical display device using the above material roll by bonding the optical film to a surface of the optical display unit, comprising:

a cutting and bonding apparatus for cutting at least the optical film of the long sheet material drawn from the material roll into a predetermined length and bonding a cut piece of the optical film to a surface of the optical display unit.

According to such a feature, there can be provided a system for manufacturing an optical display device with the same advantage as the material roll according to the invention.

A method for manufacturing an optical display device of the present invention is a method for manufacturing an optical display device using the material roll according to any one of claims 1 to 8 by bonding the optical film to a surface of the optical display unit, comprising:

a cutting and bonding step comprising cutting at least the optical film of the long sheet material drawn from the material roll into a predetermined length and bonding a cut piece of the optical film to a surface of the optical display unit.

According to such a feature, there can be provided a method for manufacturing an optical display device with the same advantage as the material roll according to the invention.

BRIEF DESCRIPTION OF THE DRAWINGS

FIG. 9 is a perspective view of a material roll showing another example of the formation of score lines in sheet materials.

EMBODIMENTS FOR CARRYING OUT THE INVENTION

Figure 1:
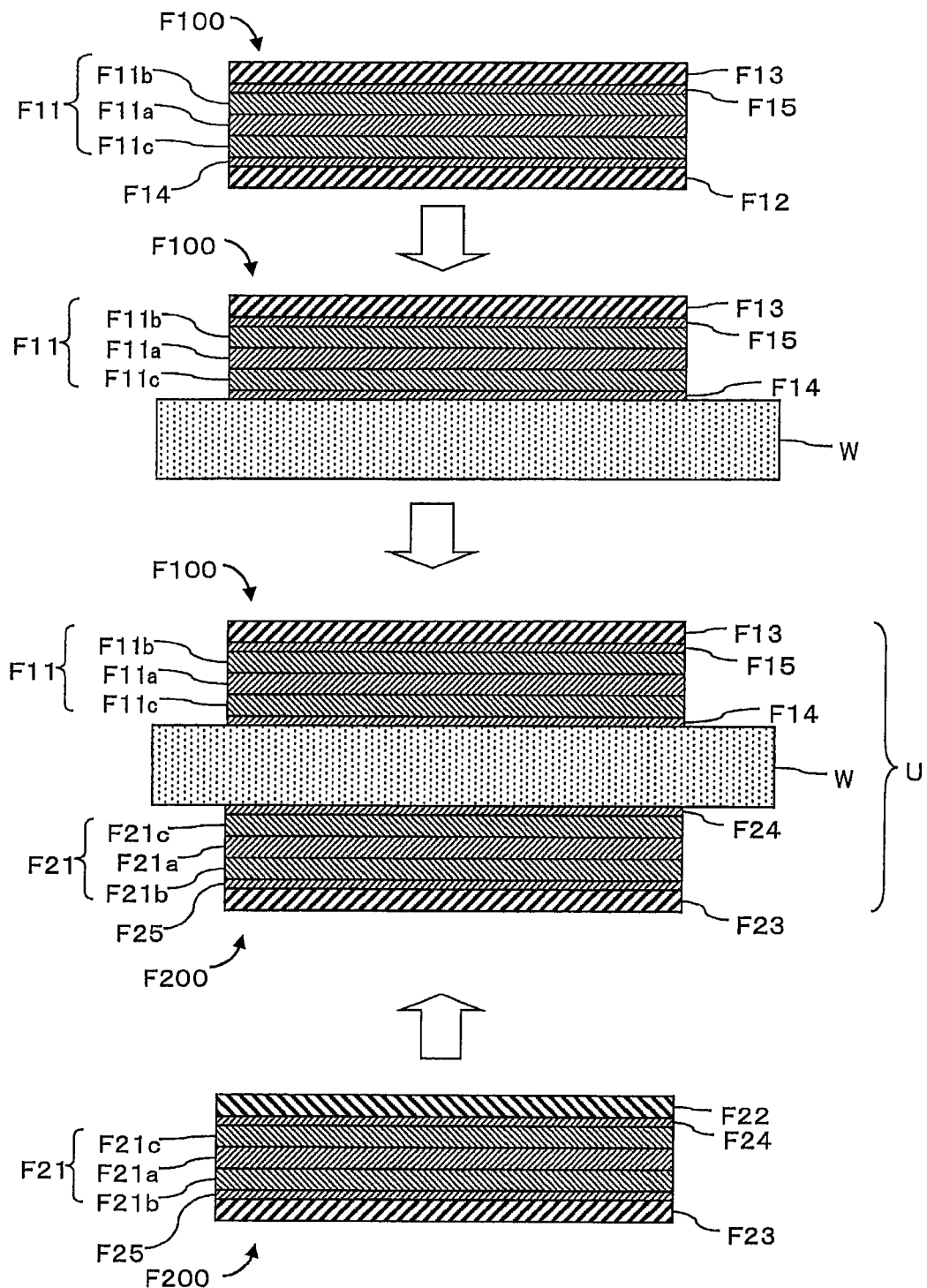
FIG. 1 is a schematic cross-sectional view showing a process of manufacturing an optical display device by bonding optical sheet pieces to an optical display unit.

FIG. 1 is a schematic cross-sectional view showing the process of manufacturing an optical display device U by bonding optical sheet pieces F100 and F200 to an optical display unit W. The invention is effective in manufacturing a large optical display device U such as a 32 or more inch display device and particularly effective in manufacturing a liquid crystal panel such as a VA- or IPS-mode liquid crystal panel.

In this embodiment, the optical display device U is manufactured by a process including bonding a first optical sheet piece F100 to one surface of an optical display unit W, wherein the first sheet piece is formed by cutting a long sheet material drawn from a first material roll, and bonding a second optical sheet piece F200 to the other surface of the optical display unit W, wherein the second sheet piece is formed by cutting a long sheet material drawn from a second material roll. It will be understood that this process is non-limiting, and alternatively, an optical sheet piece may be bonded to only one surface of the optical display unit W.

Optical Display Unit

Examples of the optical display unit W include a glass substrate unit for a liquid crystal cell and an organic Electro-Luminescent (EL) light-emitting unit. The optical display unit W typically has a rectangular shape.

Optical Sheet Pieces

The optical sheet pieces F100 and F200 are each typically, but not limited to, a laminated film including at least one of a polarizing film, a retardation film and a brightness enhancement film. The optical sheet pieces F100 and F200 have first pressure-sensitive adhesive layers F14 and F24, respectively, on one side to form bonding surfaces for the optical display unit W, and first base films F12 and F22 are bonded to the first pressure-sensitive adhesive layers F14 and F24, respectively. The process of bonding the optical sheet pieces F100 and F200 to the optical display unit W includes peeling off the first base films F12 and F22 from the optical sheet pieces F100 and F200, respectively, with the first pressure-sensitive adhesive layers F14 and F24 left therein, and bonding the optical sheet pieces F100 and F200 to the optical display unit W with the first pressure-sensitive adhesive layers F14 and F24 interposed therebetween.

In this example, the first optical sheet piece F100 includes a first optical film F11 and a second base film F13. For example, the first optical film F11 includes a polarizer F11a, a first film F11b bonded to one surface thereof, and a second film F11c bonded to the other surface thereof.

The first base film F12 is a release film (so-called separator), which is attached to a first surface (on the second film F11c side) of the first optical film F11 with the first pressure-sensitive adhesive layer F14 interposed therebetween. The second base film F13 is a surface protecting film, which is attached to a second surface (on the first film F11b side) of the first optical film F11 with the second pressure-sensitive adhesive layer F15 interposed therebetween. After the first optical sheet piece F100 is bonded to the optical display unit W, the second base film F13 and the second pressure-sensitive adhesive layer F15 are peeled off from the first optical film F11. The first film F11b is a polarizer protecting film for protecting the polarizer F11a from scratching, fouling or any other damage. The second film F11c is a coating layer for adhesion to the first pressure-sensitive adhesive layer F14 and protection of the polarizer.

It will be understood that such a structure is non-limiting, and alternatively, any other film than the surface protecting film may be attached as the second base film F13 to the first optical film F11. The structure in which a polarizer protecting film (as the first film F11b) is provided on only one side of the polarizer F11a is also non-limiting, and alternatively, polarizer protecting films may be provided on both sides of the polarizer F11a.

Similarly, the second optical sheet piece F200 includes a second optical film F21 and a second base film F23. For example, the second optical film F21 includes a polarizer F21a, a first film F21b bonded to one surface thereof, and a second film F21c bonded to the other surface thereof.

The first base film F22 is a release film (so-called separator), which is attached to a first surface (on the second film F21c side) of the second optical film F21 with the first pressure-sensitive adhesive layer F24 interposed therebetween. The second base film F23 is a surface protecting film, which is attached to a second surface (on the first film F21b side) of the second optical film F21 with the second pressure-sensitive adhesive layer F25 interposed therebetween. After the second optical sheet piece F200 is bonded to the optical display unit W, the second base film F23 and the second pressure-sensitive adhesive layer F25 are peeled off from the second optical film F21. The first film F21b is a polarizer protecting film for protecting the polarizer F21a from scratching, fouling or any other damage. The second film F21c is a coating layer for adhesion to the first pressure-sensitive adhesive layer F24 and protection of the polarizer.

It will be understood that such a structure is non-limiting, and alternatively, any other film than the surface protecting film may be attached as the second base film F23 to the second optical film F21. The structure in which a polarizer protecting film (as the first film F21b) is provided on only one side of the polarizer F21a is also non-limiting, and alternatively, polarizer protecting films may be provided on both sides of the polarizer F21a.

In this embodiment, the first material roll is manufactured by winding a first sheet material into a roll, wherein the first sheet material includes the long first optical film F11, the first base film F12 provided on the first surface of the first optical film F11 with the first pressure-sensitive adhesive layer F14 interposed therebetween, and the second base film F13 provided on the second surface of the first optical film F11 with the second pressure-sensitive adhesive layer F15 interposed therebetween. The second material roll is manufactured by winding a second sheet material into a roll, wherein the second sheet material includes the long second optical film F21, the first base film F22 provided on the first surface of the second optical film F21 with the first pressure-sensitive adhesive layer F24 interposed therebetween, and the second base film F23 provided on the second surface of the second optical film F21 with the second pressure-sensitive adhesive layer F25 interposed therebetween.

Structure of Sheet Materials

Figure 2:
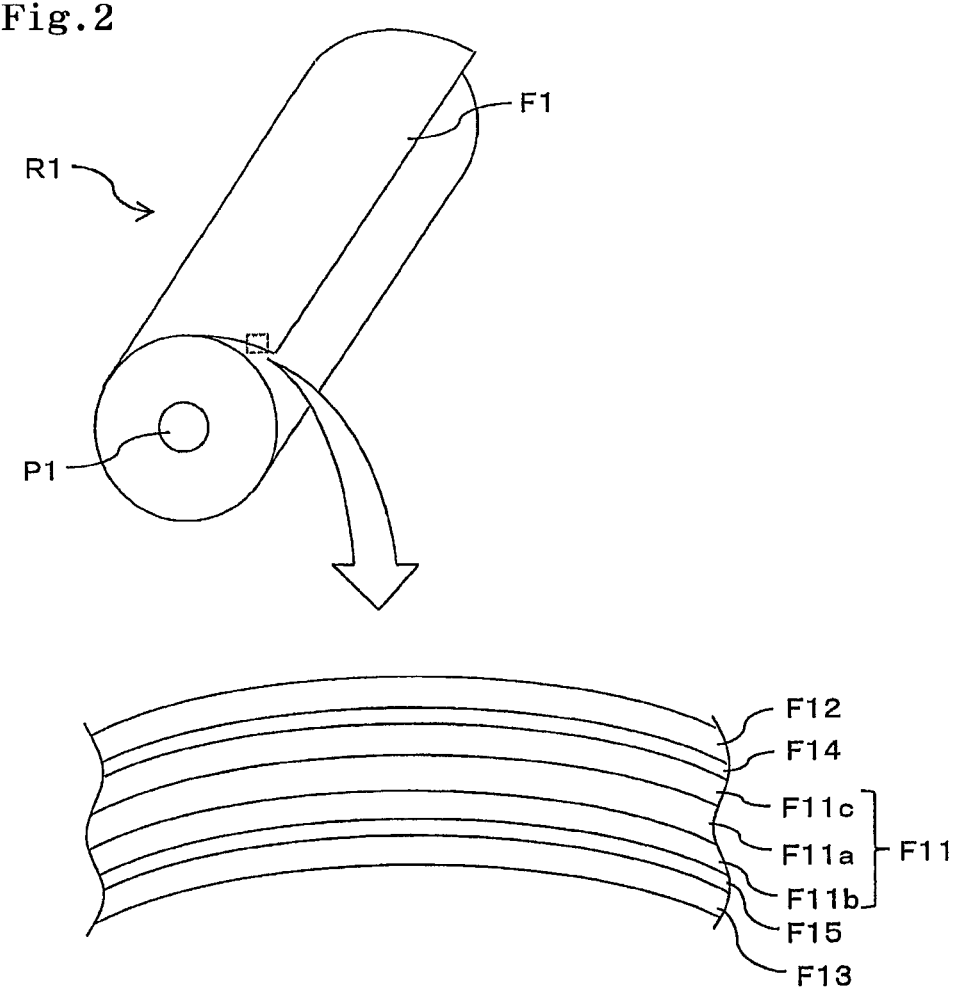
FIG. 2 is a cross-sectional view showing an example of the structure of a first sheet material.

FIG. 2 is a cross-sectional view showing an example of the structure of the first sheet material F1. In this embodiment, the second sheet material is formed by laminating films in the same manner as the first sheet material F1. Therefore, only the structure of the first sheet material F1 is described below.

As described above, the first sheet material F1 has a structure comprising the first base film F12, the first pressure-sensitive adhesive layer F14, the first optical film F11, the second pressure-sensitive adhesive layer F15, and the second base film F13, which are wound in this order. In this embodiment, as shown in FIG. 2, the first sheet material F1 having the structure as described above is wound around a core P1 in such a manner that the first base film F12 is located on the outer side and the second base film F13 is located on the inner side, so that the first material roll R1 is formed.

The polarizer F11a comprises a film-shaped polarizer (a polyvinyl alcohol-based film), which is typically obtained by drying a polyvinyl alcohol (PVA) film having undergone dyeing, crosslinking, and stretching. The first film F11b serving as a polarizer protecting film typically comprises a TAC (triacetylcellulose) film or a PET (polyethylene terephthalate) film. For example, the second film F11c serving as a coating layer is preferably an adhesive composed mainly of polyvinyl alcohol, isocyanate, cyanoacrylate, aziridine, or the like. The first optical film F11 typically has a thickness of 20 to 300 μm.

The first base film F12 is typically made of a polyester polymer such as polyethylene terephthalate (PET). The first base film F12 typically has a thickness of 30 to 80 μm.

The second base film F13 is preferably made of the same material as the first base film F12 and typically made of a polyester polymer such as polyethylene terephthalate (PET). The second base film F13 typically has a thickness of 30 to 80 μm.

Examples of the material that may be used to form the first and second base films F12 and F13 include not only polyethylene terephthalate but also, in view of transparency, mechanical strength, thermal stability, water-blocking performance, isotropy, durability, productivity, or the like, polyester polymers other than polyethylene terephthalate, such as polyethylene naphthalate, cellulose polymers such as diacetylcellulose and triacetylcellulose, acryl-based polymers such as poly(methyl methacrylate), styrene polymers such as polystyrene and acrylonitrile-styrene copolymers, polycarbonate polymers, polyethylene, polypropylene, cyclic or norbornene structure-containing olefin resins, vinyl chloride polymers, amide polymers such as nylon and aromatic polyamide, imide polymers, sulfone polymers, polyether sulfone polymers, polyether ether ketone polymers, polyphenylene sulfide polymers, vinyl alcohol polymers, vinylidene chloride polymers, vinyl butyral polymers, acrylate polymers, polyoxymethylene polymers, and epoxy polymers, or any blend of the above polymers.

In view of cost, handleability, transparency, or the like, the first and second base films F12 and F13 are preferably made of an olefin polymer or a polyester polymer and more preferably made of a polyester polymer so that the films can resist the formation of defects (so called fish eyes) which is caused by the incorporation of undissolved part and degraded product of the material into the films. Also in view of cost and handleability or the like, the first and second base films F12 and F13 are preferably made of polyethylene terephthalate.

In the first material roll R1, the first base film F12, the first pressure-sensitive adhesive layer F14, the first optical film F11, the second pressure-sensitive adhesive layer F15, and the second base film F13 are wound in this order from the outside and wound into the roll. In the first material roll R1, therefore, stress in the contraction direction acts on an inner part thereof, while stress in the tensile direction acts on an outer part thereof. Thus, lifting is less likely to occur at the interface between the first base film F12 and the first pressure-sensitive adhesive layer F14, on which stress in the tensile direction acts, while lifting is more likely to occur at the interface between the first pressure-sensitive adhesive layer F14 and the first optical film F11, on which stress in the contraction direction acts. However, the adhering strength B of the first optical film F11-side interface of the first pressure-sensitive adhesive layer F14 is set greater than the adhering strength A of the first base film F12-side interface of the first pressure-sensitive adhesive layer F14, so that lifting is inhibited between the first base film F12 and the first optical film F11.

In a high-temperature environment, the first base film F12, the first pressure-sensitive adhesive layer F14, the first optical film F11, the second pressure-sensitive adhesive layer F15, and the second base film F13 themselves shrink, respectively, and therefore, greater stress in the shrinkage direction acts on the second base film F13, which is located on the inner side, so that lifting is more likely to occur between the second base film F13 and the first optical film F11. However, the adhering strengths C and D of the second pressure-sensitive adhesive layer F15 are set greater than the adhering strength A of the first base film F12-side interface of the first pressure-sensitive adhesive layer F14, and the first optical film F11 is wound into the roll in such a manner that the second base film F13 side with such a greater adhering strength is located on the inner side, so that lifting is suppressed between the second base film F13 and the first optical film F11, which makes it possible to improve the durability in a high-temperature environment.

The same effect as described above is also produced in the second material roll R2 comprising the first base film F22, the first pressure-sensitive adhesive layer F24, the second optical film F21, the second pressure-sensitive adhesive layer F25, and the second base film F23 which are wound in this order from the outside and wound into the roll.

A system and a method according to an embodiment of the invention for manufacturing an optical display device U with material rolls according to the invention are described in detail below. While this embodiment shows a case where the optical display unit W has an oblong shape, the shape of the optical display unit W is not limited to the oblong and may be any other rectangular shape such as a square.

Material Rolls

The first material roll R1 is a roll of a first long sheet material F1, which is obtained by slitting a long material into a width corresponding to the short side of the optical display unit W, wherein the long material includes the first base film F12, the first pressure-sensitive adhesive layer F14, the first optical film F11, the second pressure-sensitive adhesive layer F15, and the second base film F13 laminated in this order.

The second material roll R2 is a roll of a second long sheet material F2, which is obtained by slitting a long material into a width corresponding to the long side of the optical display unit W, wherein the long material includes the first base film F22, the first pressure-sensitive adhesive layer F24, the second optical film F21, the second pressure-sensitive adhesive layer F25, and the second base film F23 laminated in this order.

When the optical display unit W is oblong as in this embodiment, the expression "corresponding to the width of the optical display unit" means "corresponding to the long or short side of the optical display unit." The expression "corresponding to the long or short side of the optical display unit" is intended to include not only cases where the width of the optical film is equal to the long or short side of the optical display unit but also cases where the width of the optical film slightly differs from the long or short sides of the optical display unit.

The material rolls to be used may be those having defect information attached thereto in advance, and in such a case, no in-line inspection step is required. For example, defect information may be printed on the material rolls in advance, and the reading of the information may be reflected in the cutting step so that cutting can be performed while the defects are avoided.

Method for Manufacturing Material Rolls

As described above, the widths of the first and second material rolls R1 and R2 depend on the size of the optical display unit W to be bonded. More specifically, the width of the first material roll R1 is determined to correspond to the short side of the optical display unit W, and the width of the second material roll R2 is determined to correspond to the long side of the optical display unit W. In this embodiment, therefore, the first and second material rolls R1 and R2 have different widths, and the first and second material rolls R1 and R2 to be used are obtained by previously slitting long materials (material rolls having undergone no slitting process) into predetermined widths.

The slitting process to be used may be any of a method of slitting the long material being unwound and a method of slitting the long material not being unwound. Preferably, the long material being unwound is slit parallel to the longitudinal direction. The material rolls R1 and R2, which are rolls of sheet materials F1 and F2 having widths corresponding to the short and long sides of the optical display unit W, respectively, can be easily manufactured using a process in which the long material being unwound is slit parallel to the longitudinal direction. When the optical films F11 and F21 each include a polarizing film, the slitting process in which the long material being unwound is slit parallel to the longitudinal direction can be performed parallel to the absorption axis of the polarizing film, so that the absorption axis of the polarizing film in each of the optical films F11 and F21 can be made parallel, with high accuracy, to the longitudinal direction of the sheet materials F1 and F2 obtained by the slitting process. In the lamination process, therefore, the absorption axis can be made parallel, with high accuracy, to the long or short side of the optical display unit W, which makes it possible to manufacture optical display devices of higher quality. Alternatively, in a long sheet material F1 or F2-manufacturing line, the long sheet may be slit before it is wound into a roll.

Manufacturing Flow Chart

Figure 3:
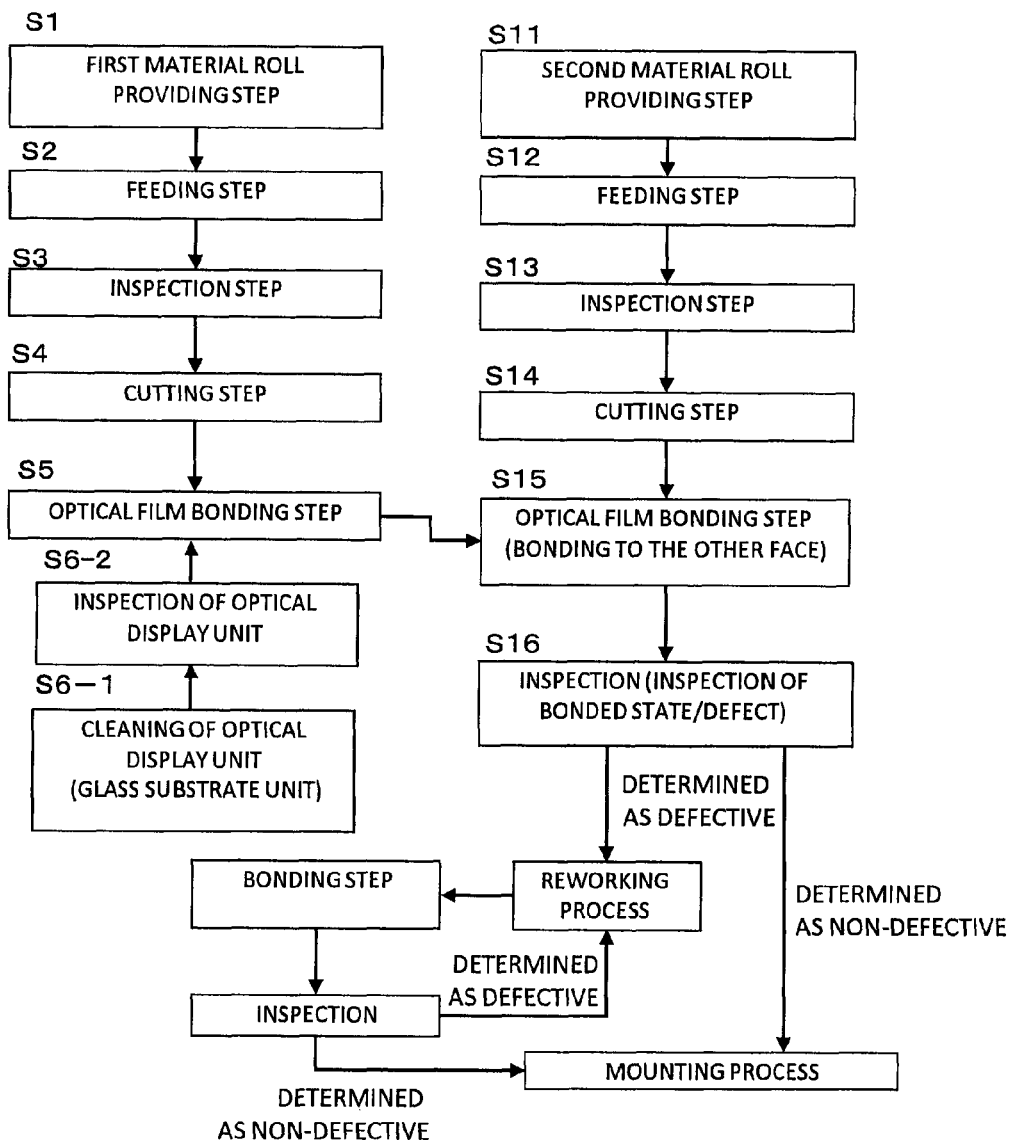
FIG. 3 is a flow chart showing an example of the method for manufacturing an optical display device.
Figure 4:
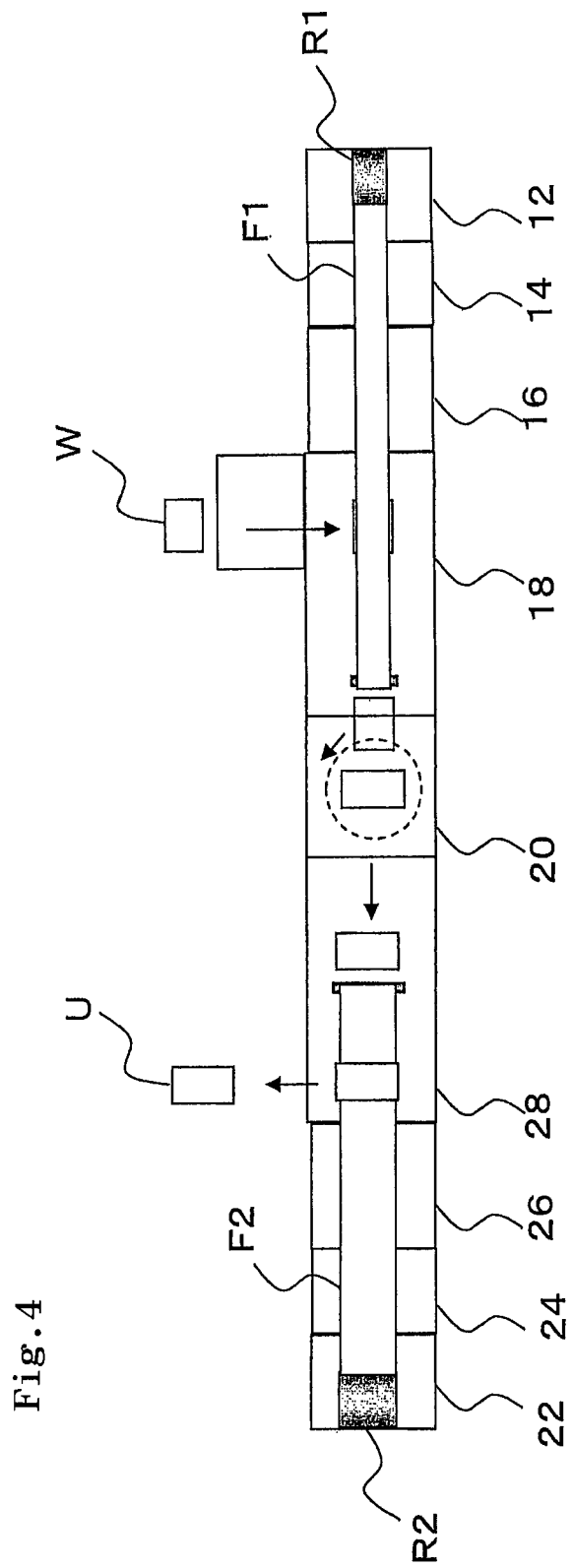
FIG. 4 is a layout plan view showing an example of the system for manufacturing an optical display device.

FIG. 3 is a flow chart showing an example of the method for manufacturing the optical display device U. FIG. 4 is a layout plan view showing an example of the system for manufacturing the optical display device U.

A description is given below of a method for manufacturing the optical display device U including the optical display unit W and the optical films F11 and F21 each including a polarizing film and bonded to the optical display unit W. This embodiment shows a process including a first cutting and bonding step and a second cutting and bonding step, in which these steps may be performed in any order or may be performed at the same time or substantially at the same time. Alternatively, the optical display device U may be manufactured by bonding an optical film to only one surface of the optical display unit W. In such a case, only one of first and second cutting and bonding steps may be performed.

The first cutting and bonding step includes drawing the first sheet material F1 from the first material roll R1, cutting at least the first optical film F11 into a predetermined length, and bonding the first optical film F11 to one surface of the optical display unit W. In this embodiment, the predetermined length corresponds to the long side of the optical display unit W.

The second cutting and bonding step includes drawing the second sheet material F2 from the second material roll R2, cutting at least the second optical film F21 into a predetermined length, and bonding the second optical film F21 to the other surface of the optical display unit W. In this embodiment, the predetermined length corresponds to the short side of the optical display unit W.

For example, the first cutting and bonding step may be performed by the process from (2) Feeding Step to (5) First Bonding Step described below. For example, the second cutting and bonding step may be performed by the process from (8) Feeding Step to (11) Second Bonding Step described below. However, it should be noted that the first cutting and bonding step only has to include the first cutting step and the first bonding step and that the second cutting and bonding step only has to include the second cutting step and the second bonding step.

In a factory, each step described below is preferably performed in an isolated structure with cleanliness maintained. In particular, cleanliness is preferably maintained in the steps of bonding the optical films F11 and F21 to the optical display unit W.

(1) Step of Providing First Material Roll (S1 in FIG. 3). As described above, the first long sheet material F1 is provided in the form of the first material roll R1. The core P1 of the first material roll R1 is mounted on a roll mount apparatus that is geared to a motor or the like to rotate freely or at a certain speed.

(2) Feeding Step (S2 in FIG. 3). The first sheet material F1 is fed to the downstream side from the first material roll R1 provided and placed. The first sheet material F1 is fed by a first feeder 12, for example, which includes a pair of nip rollers, a tension roller, a rotary drive, an accumulator, a sensor, a controller, and other components.

(3) First Inspection Step (S3 in FIG. 3). The first sheet material F1 is inspected for defects using a first defect inspection apparatus 14. In this step, the defect inspection method may be a method of performing imaging and image processing on both sides of the first sheet material F1 with transmitted light or reflected light, a method of performing imaging and image processing with a polarizing film for inspection arranged in a crossed Nicols relationship (also referred to as "0° cross") with the absorption axis of the polarizing film (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing film (the object to be inspected) between a CCD camera and the object. Known methods may be used for the image processing algorithm. For example, defects may be detected by gray scale determination based on binarization.

The method of performing imaging and image processing with transmitted light allows the detection of contaminants in the first sheet material F1. The method of performing imaging and image processing with reflected light allows the detection of contaminants deposited on the surface of the first sheet material F1. In the method of performing imaging and image processing with 0° cross, surface contaminants, dirt, and interior contaminants can generally be detected as bright spots. In the method of performing imaging and image processing with X° cross, knicks can generally be detected.

Defect information detected by the first defect inspection apparatus 14 is associated with the positional information (such as position coordinates) and sent to a controller so that it can contribute to the cutting process with a first cutting apparatus 16 as described below.

(4) First Cutting Step (S4 in FIG. 3). The first cutting apparatus 16 cuts the first pressure-sensitive adhesive layer F14, the first optical film F11, the second pressure-sensitive adhesive layer F15, and the second base film F13 of the first sheet material F1 into predetermined lengths without cutting the first base film F12. As a result, a first optical sheet piece F100 is formed, which is composed of cut pieces of the first pressure-sensitive adhesive layer F14, the first optical film F11, the second pressure-sensitive adhesive layer F15, and the second base film F13, and the first base film F12 can be used as a carrying medium (carrier film) for the first optical sheet piece F100.

For example, the cutting means may be a laser, a cutter, or any other known cutting means. The cutting means may be configured so that defects can be separated and eliminated from the region to be bonded to the optical display unit W by cutting based on the defect information obtained by the first defect inspection apparatus 14. This can significantly improve the yield of the first sheet material F1. Such a method in which cutting is performed so that defects can be avoided and eliminated from the region to be bonded to the optical display unit W is called skip cutting. The defect information for use in the cutting may be detected by an in-line defect inspection apparatus or attached to the material roll in advance. The system is configured so that any defect-containing part of the first sheet material F1 can be rejected by a first rejection apparatus (not shown) so as not to be bonded to the optical display unit W. Therefore, the steps of feeding the first and second optical films F11 and F21 preferably include a defective part-removing step that includes cutting and removing any defective-containing part of the optical film.

Figure 5:
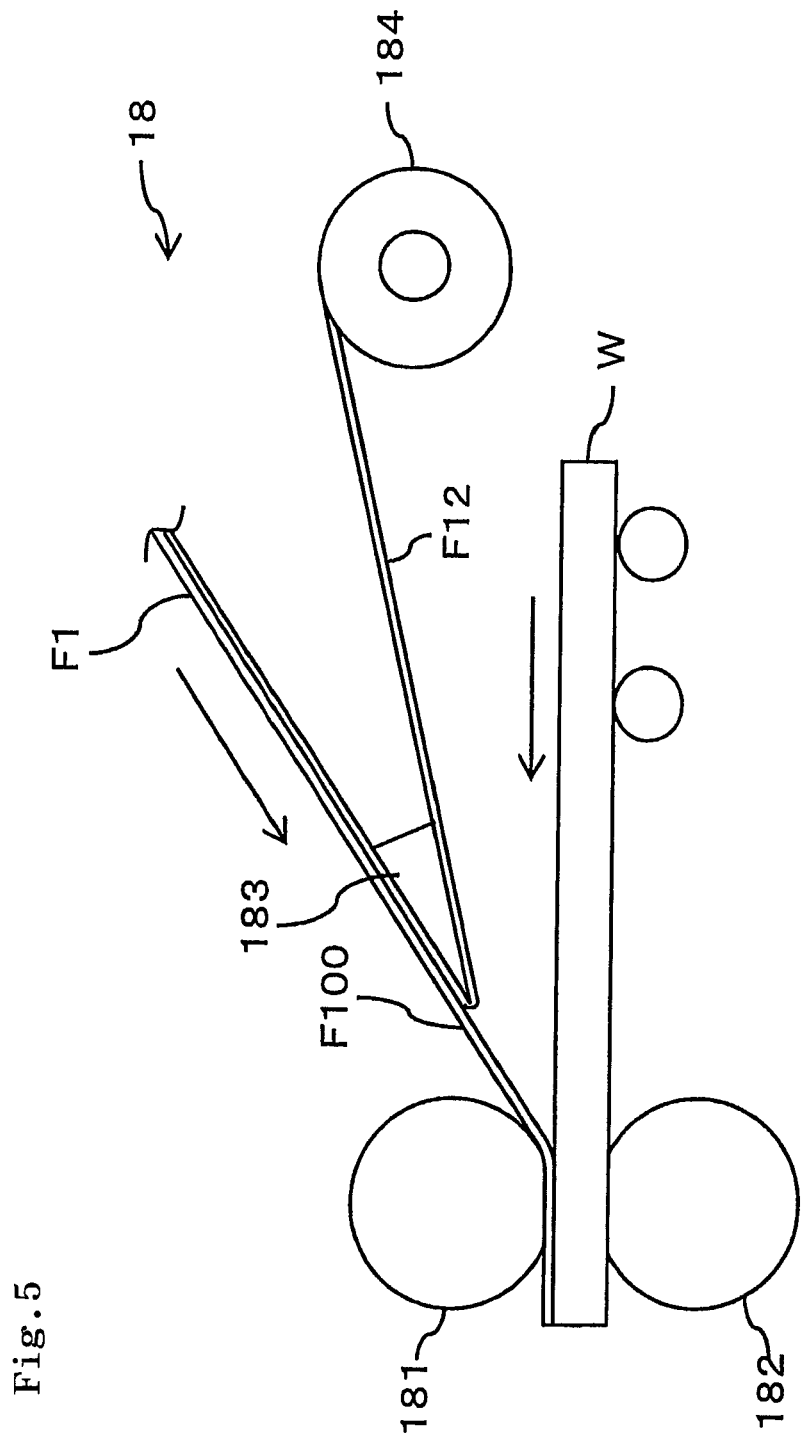
FIG. 5 is a schematic diagram showing a process of bonding a first optical sheet piece to an optical display unit.

(5) First Bonding Step (S5 in FIG. 3). While the first base film F12 of the first sheet material F1 is peeled off using a first peeling apparatus (not shown), the first optical film F11 separated from the first base film F12 is bonded to the optical display unit W with the first pressure-sensitive adhesive layer F14 interposed therebetween using a first bonding apparatus 18. FIG. 5 is a schematic diagram showing the step of bonding the first optical sheet piece F100 to the optical display unit W. As shown in FIG. 5, the bonding step includes press-bonding the first optical sheet piece F100 and the optical display unit W together by inserting them between a pair of rolls 181 and 182. The peeling mechanism of the first peeling apparatus has a sharp-ended knife edge 183 and is configured so that the first base film F12 can be peeled off by hooking it on the knife edge 183 and reversing the direction of the feeding and that after the separation of the first base film 12, the first optical sheet piece F100 can be fed from the upper side to one surface of the optical display unit W. The separated first base film F12 is wound around a roll 184. The winding around the roll 184 is controlled by the controller.

(6-1) Cleaning Step (S6-1 in FIG. 3). For example, the surface of the optical display unit W is cleaned using a polishing cleaning apparatus and a water cleaning apparatus. The cleaned optical display unit W is transported to an inspection apparatus by a feeding mechanism. For example, the feeding mechanism includes feed rollers, a feed direction-switching mechanism, a rotary drive, a sensor, a controller, and other components.

(6-2) Inspection Step (S6-2 in FIG. 3). For example, after the cleaning, the surface of the optical display unit W is inspected using an inspection apparatus. After the inspection, the optical display unit W is fed to the first bonding apparatus 18 by the feeding mechanism.

All of the step of providing the first material roll, the first inspection step, the first cutting step, the first bonding step, the cleaning step, and the inspection step are preferably performed in a continuous manufacturing line. In the above series of manufacturing steps, the first optical film F11 is bonded to one surface of the optical display unit W. A description is given below of manufacturing steps in which the second optical film F21 is bonded to the other surface of the optical display unit W.

(7) Step of Providing Second Material Roll (S11 in FIG. 3). As described above, the second long sheet material F2 is provided in the form of the second material roll R2. As in the case of the first material roll R1, the core of the second material roll R2 is mounted on a roll mount apparatus that is geared to a motor or the like to rotate freely or at a certain speed.

(8) Feeding Step (S12 in FIG. 3). The second sheet material F2 is fed to the downstream side from the second material roll R2 provided and placed. The second sheet material F2 is fed by a second feeder 22, for example, which includes a pair of nip rollers, a tension roller, a rotary drive, an accumulator, a sensor, a controller, and other components.

(9) Second Inspection Step (S13 in FIG. 3). The second sheet material F2 is inspected for defects using a second defect inspection apparatus 24. In this step, the defect inspection method is the same as the above method using the first defect inspection apparatus 14.

(10) Second Cutting Step (S14 in FIG. 3). A second cutting apparatus 26 cuts the first pressure-sensitive adhesive layer F24, the second optical film F21, the second pressure-sensitive adhesive layer F25, and the second base film F23 of the second sheet material F2 without cutting the first base film F22. As a result, a second optical sheet piece F200 is formed, which is composed of cut pieces of the first pressure-sensitive adhesive layer F24, the second optical film F21, the second pressure-sensitive adhesive layer F25, and the second base film F23, and the first base film F22 can be used as a carrying medium (carrier film) for the second optical sheet piece F200.

For example, the cutting means may be a laser, a cutter, or the like. The cutting means may be configured so that defects can be separated and eliminated from the region to be bonded to the optical display unit W by cutting based on the defect information obtained by the second defect inspection apparatus 24. This can significantly improve the yield of the second sheet material F2. The system is configured so that any defect-containing part of the second sheet material F2 can be rejected by a second rejection apparatus (not shown) so as not to be bonded to the optical display unit W.

(11) Second Bonding Step (S15 in FIG. 3). Subsequently, after the second cutting step, while the first base film F22 of the second sheet material F2 is peeled off using a second peeling apparatus (not shown), the second optical film F21 separated from the first base film F22 is bonded to the other surface of the optical display unit W than the surface, to which the first optical film F11 is bonded, with the first pressure-sensitive adhesive layer F24 interposed therebetween using a second bonding apparatus 28. Before the second optical film F21 is bonded to the optical display unit W, the optical display unit W is turned by 90° using the feed direction-switching mechanism (a turning apparatus 20) of the feeding mechanism so that the first and second optical films F11 and F21 can have a crossed Nicols relationship.

Therefore, the process preferably includes the step of turning the optical display unit W, which has undergone the first cutting and bonding step, to the direction of bonding in the second cutting and bonding step. The turning step is preferably performed so that the direction of the long side of the first optical film F11 bonded to the optical display unit W can make an angle of 0±5°, preferably 0±1°, with the direction of the long side of the second optical film F21 to be bonded after cutting. For example, when the direction of the first optical film F11-feeding line is parallel to the direction of the second optical film F21-feeding line (including when they are on a straight line), the turning angle in the turning step is preferably from 85° to 95°. Alternatively, however, the turning apparatus 20 may be omitted. In such a case, the feed direction of the first sheet material F1 and the feed direction of the second sheet material F2 may be arranged not parallel but perpendicular to each other.

The configuration of the second bonding apparatus 28 is almost the same as that of the first bonding apparatus 18 described with reference to FIG. 5, but different in that it is configured so that the second optical sheet piece F200 separated from the first base film F22 is fed from the lower side to the other surface of the optical display unit W. There may be provided a mechanism for turning over the optical display unit W after the first optical sheet piece F100 is bonded thereto (turning-over apparatus). In such a case, the second optical sheet piece F200 separated from the first base film F22 may be fed from the upper side to the other surface of the optical display unit W similarly to when the first bonding apparatus 18 is used. The turning-over apparatus may be provided separately from the turning apparatus 20 or integrated with the turning mechanism 20 so that the optical display unit W can be turned and turned over at the same time.

(12) Step of Inspecting Optical Display Device (S16 in FIG. 3). An inspection apparatus is used to inspect the optical display device U after the optical films are bonded. An example of the inspection method is a method of performing imaging and image processing on both sides of the optical display device U with reflected light. Another example of the method uses a polarizing film for inspection placed between a CCD camera and the object to be inspected. Known methods may be used for the image processing algorithm. For example, defects may be detected by gray scale determination based on binarization.

(13) Defect information obtained using the inspection apparatus is used to determine whether the optical display device U is non-defective. The optical display device U determined to be non-defective is transferred to the next implementing step. When determined to be defective, it is subjected to a reworking process, in which a new optical film is bonded, and then the product is inspected. The product determined to be non-defective is transferred to the implementing step, but the product determined to be defective is subjected to the rewording process again or to disposal.

In the above series of manufacturing steps, the first optical film F11 bonding step and the second optical film F21 bonding step may be performed in a continuous manufacturing line, which makes it possible to manufacture the optical display device U in a satisfactory manner.

Another Mode of Skip Cutting

Another mode of the first and second cutting steps is described below. This mode is particularly effective when the first and second inspection steps are absent. Information about defects in each of the first and second sheet materials (such as coordinates of defects, defect type, and defect size) may be attached as coded information (such as QR codes or bar codes) to one transverse end portion of each of the first and second material rolls at predetermined intervals (e.g., 1,000 mm). In such a case, the coded information may be read and analyzed at a stage before the bonding of the optical film, and then in each of the first and second cutting steps, the optical film may cut into a predetermine size. The system may be configured so that the defect-containing part can be removed or bonded to a certain member other than the optical display unit and that the predetermined-size cut piece of the optical sheet determined to be non-defective can be bonded to the optical display unit. This significantly increases the yield of the optical display unit U.

In a continuous process including drawing the sheet materials F1 and F2 from the material rolls R1 and R2 and bonding the optical films F11 and F21 to the optical display unit W as shown in the above embodiment, it is difficult to visually detect lifting present in the sheet materials F1 and F2 so that the lifting can be treated as a defect until the optical films F11 and F21 are bonded to the optical display unit W, and it is also difficult to reliably detect the lifting with no fault even by automatic detection of defects with the defect inspection apparatuses 14 and 24. However, when the material rolls R1 and R2 in which the sheet materials F1 and F2 resist lifting as described above are used, the production of defective optical display devices U can be more effectively prevented.

When the width of the sheet materials F1 and F2 corresponds to any one side of the oblong optical display unit W as shown in the embodiment, the sheet materials F1 and F2 are required to have no lifting along their entire width. When the material rolls R1 and R2 in which the sheet materials F1 and F2 resist lifting as described above are used, the sheet materials F1 and F2 resist lifting along their entire width, so that the production of defective optical display devices U can be more effectively prevented even when the width of the sheet materials F1 and F2 corresponds to any one side of the optical display unit W.

The material rolls R1 and R2 according to the embodiment are formed so that the first pressure-sensitive adhesive layers F14 and F24 can be left on the optical films F11 and F21, respectively, when the first base films F12 and F22 are peeled off. Therefore, in the continuous process including drawing the sheet materials F1 and F2 from the material rolls R1 and R2 and bonding the optical films F11 and F21 to the optical display unit W, the first base films F12 and F22 can be used as release films (separators). Specifically, the material rolls R1 and R2 according to the invention each have a structure in which the sheet material F1 or F2 is wound into the roll in such a manner that the release film is located on the outer side. In this case, the optical sheet pieces F100 and F200 have a tendency to curl, at the ends, away from the optical display unit W during the bonding process. Therefore, when the optical sheet pieces F100 and F200 and the optical display unit W are fed between a pair of rolls and bonded together, the ends of the optical sheet pieces F100 and F200 do not come into contact with the optical display unit W before they arrive at the intended feed position, so that the optical sheet pieces F100 and F200 do not get stuck and can be bonded stably. Thus, it is possible to prevent lamination bubbles (hereinafter referred to as "corrugating") which would otherwise occur at the end portions of the optical sheet pieces F100 and F200 when the optical sheet pieces F100 and F200 get stuck during the bonding step. The tendency to curl is particularly preferred when the optical sheet piece F100 is bonded from the upper side to the optical display unit W. The tendency to curl also provides the advantage that the ends of the optical sheet pieces F100 and F200 can be easily separated from the first base films F12 and F22, respectively.

In addition, as shown in the embodiment, the optical films F11 and F21 are bonded to the surfaces of the optical display unit W, while the optical films F11 and F21 and the second base films F13 and F23 are peeled off from the first base films F12 and F22. In this process, if the optical films F11 and F21 and the second base films F13 and F23 are not easy to peel off from the first base films F12 and F22, the optical films F11 and F21 and the second base films F13 and F23 can be pulled toward the first base films F12 and F22 during the peeling off step, so that the bonding may not be successfully performed. However, when the material rolls R1 and R2 in which the sheet materials F1 and F2 resist lifting as described above are used, the adhering strength A can be made relatively low. Therefore, the optical films F11 and F21 and the second base films F13 and F23 can be easily peeled off from the first base films F12 and F22, so that the bonding can be successfully performed, which can prevent more effectively the production of defective optical display devices U.

When the material rolls R1 and R2 in which the sheet materials F1 and F2 resist lifting as described above are used, the sheet material F1 and F2 can be prevented from suffering from lifting even with the adhering strength A being from 0.075 to 0.4 N/25 mm. Therefore, the optical films F11 and F21 and the second base films F13 and F23 can be easily peeled off from the first base films F12 and F22, and the sheet materials F1 and F2 resist lifting, which makes it possible to successfully perform the bonding and to more effectively prevent the production of defective optical display devices U. If the adhering strength A is less than 0.075 N/25 mm, the optical films F11 and F21 and the second base films F13 and F23 may peel from the first base films F12 and F22 during the feeding of the sheet materials F1 and F2. On the other hand, if the adhering strength A is more than 0.4 N/25 mm, the optical films F11 and F21 and the second base films F13 and F23 may not successfully be peeled off from the first base films F12 and F22.

When the adhering strengths B and C satisfy the relation B>C, the second pressure-sensitive adhesive layers F15 and F25 can be reliably peeled off together with the second base films F13 and F23 in the process of peeling off the second base films F13 and F23 from the optical films F11 and F21 after the optical films F11 and F21 are bonded to the optical display unit W.

In an embodiment of the invention, the other part of the sheet material F1 or F2 than the first base film F12 or F22, namely, the optical sheet piece F100 or F200 may have a thickness of 50 to 200 μm. The optical sheet pieces F100 and F200 each preferably have a thickness of 50 to 180 μm, more preferably 50 to 150 μm.

When the optical sheet pieces F100 and F200 are thin, the optical sheet pieces F100 and F200 are not so elastic, and therefore, the adhering strength A should be made relatively low so that the optical sheet pieces F100 and F200 can be successfully peeled off from the first base films F12 and F22. When the material rolls R1 and R2 in which the sheet materials F1 and F2 resist lifting as described above are used, the adhering strength A can be made relatively low. Therefore, even when the optical sheet pieces F100 and F200 are each as thin as 50 to 200 μm, the optical sheet pieces F100 and F200 can be successfully peeled off from the first base films F12 and F22, and the sheet materials F1 and F2 can be effectively prevented from suffering from lifting, which makes it possible to successfully perform the bonding and to more effectively prevent the production of defective optical display devices U.

When the optical sheet pieces F100 and F200 are each as thin as 50 to 200 μm, the sheet materials F1 and F2 can be effectively prevented from suffering from lifting even with the adhering strength A being from 0.01 to 0.19 N/25 mm. With such a smaller adhering strength A, the optical sheet pieces F100 and F200 can be more easily peeled off from the first base films F12 and F22, so that the bonding can be more successfully performed and that the production of defective optical display devices U can be more effectively prevented. If the adhering strength A is less than 0.01 N/25 mm, the optical films F11 and F21 and the second base films F13 and F23 may peel from the first base films F12 and F22 during the feeding of the sheet materials F1 and F2. On the other hand, if the adhering strength A is more than 0.19 N/25 mm, the optical films F11 and F21 and the second base films F13 and F23 may not successfully be peeled off from the first base films F12 and F22.

When the optical films F11 and F21 of the sheet materials F1 and F2 drawn from the material rolls R1 and R2 are each continuously bonded to the optical display unit W, the sheet materials F1 and F2 should be made as long as possible so that the material rolls R1 and R2 can be replaced less frequently, which results in an improvement in the productivity of the optical display unit U. However, there is an installation limit to increase the outer diameter of the material rolls R1 and R2 by increasing the number of turns of the sheet materials F1 and F2, and the handling also becomes laborious. Therefore, too large material rolls R1 and R2 cannot be used. Accordingly, the cores of the material rolls R1 and R2 should be reduced in diameter so that the number of turns of the sheet materials F1 and F2 can be increased.

However, when the cores of the material rolls R1 and R2 are reduced in diameter, lifting becomes more likely to occur, because the curvature of the parts of the sheet materials F1 and F2 wound in the vicinity of the cores is reduced. In the embodiment, the rolls R1 and R2 in which the sheet materials F1 and F2 resist lifting as described above are used, so that lifting is less likely to occur even when the cores of the material rolls R1 and R2 are reduced in diameter, which makes it possible to satisfactorily elongate the sheet materials F1 and F2 and therefore to increase the productivity of the optical display device U.

The above embodiment has shown a method (half-cutting method) that includes drawing the sheet materials F1 and F2 from the material rolls R1 and R2, respectively, and cutting the first pressure-sensitive adhesive layer, the first optical film, the second pressure-sensitive adhesive layer, and the second base film thereof into a predetermined length without cutting the first base films thereof. Alternatively, the invention may also be applied to material rolls for use in a method of completely cutting the sheet materials F1 and F2 (full cutting method). Furthermore, roll materials having undergone half-cutting may also be used, which have score lines formed by previously cutting the other components of the sheet materials F1 and F2 than the first base films F12 and F22.

Material Rolls Having Undergone Half-Cutting

Figure 6:
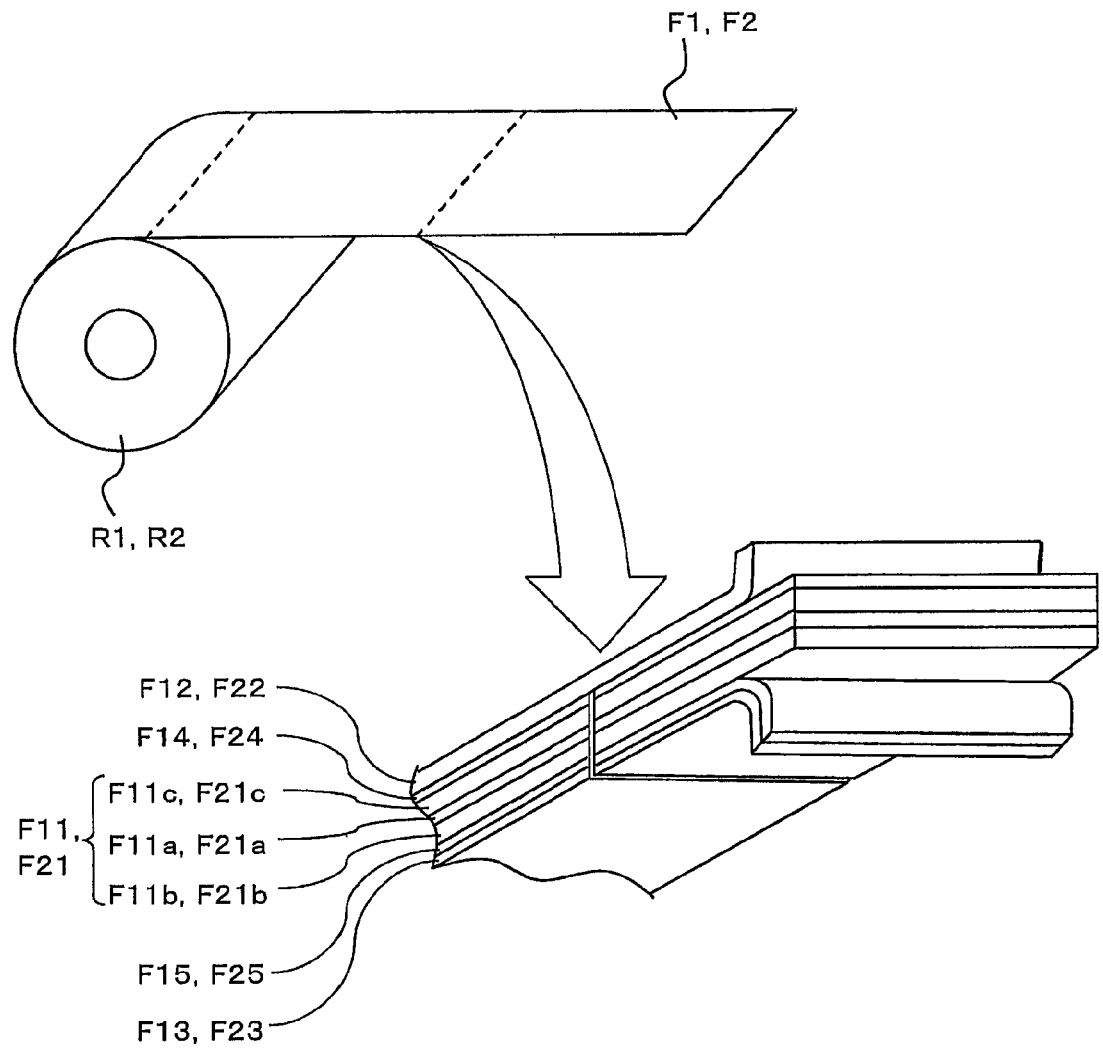
FIG. 6 is a perspective view of a roll material showing an example of the formation of score lines in sheet materials.

FIG. 6 is a perspective view of materials rolls R1 and R2 showing an example of the formation of score lines in the sheet materials F1 and F2. The material rolls R1 and R2 shown in FIG. 6 are rolls of sheet materials F1 and F2 including optical films F11 and F21 and second base films F13 and F23, respectively, which have been each previously cut into pieces with a predetermined length, and further including first base films F12 and F22, respectively, which are each left uncut.

In this example, the sheet materials F1 and F2 each have score lines that are formed at regular intervals corresponding to the long or short side of the optical display unit W. Therefore, optical sheet pieces F100 and F200 can be each obtained by dividing the sheet material by each score line and then bonded to the optical display unit W.

When these material rolls R1 and R2 are used, the optical display device U can be manufactured using an optical display device manufacturing system that is configured in the same manner as shown in the above embodiment, except that the cutting apparatuses 16 and 26 are omitted. Specifically, the bonding apparatuses 18 and 28 may be used in a process including drawing the sheet materials F1 and F2 from the material rolls R1 and R2, respectively, peeling off optical sheet pieces F100 and F200, which have previously undergone cutting into predetermined lengths, from the first base films, respectively, and bonding them to the optical display unit W, so that the optical display device U can be manufactured.

Figure 7:
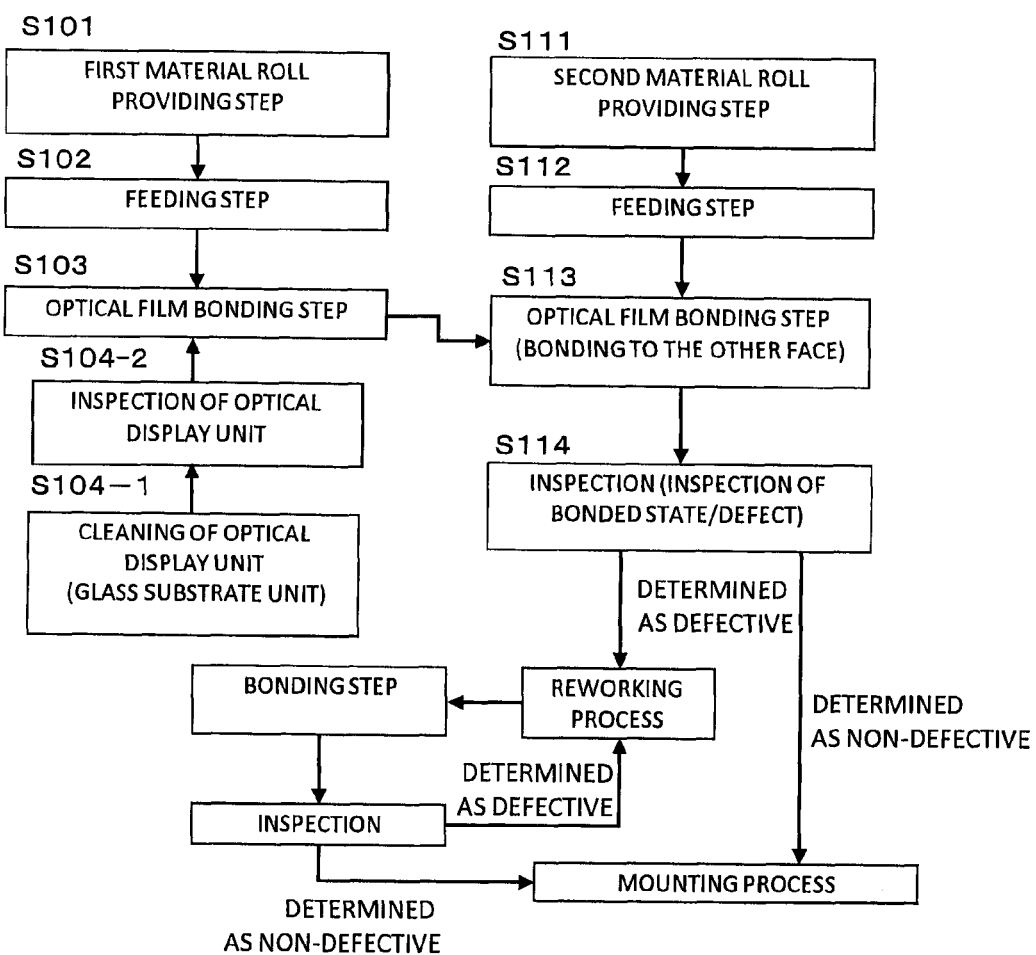
FIG. 7 is a flow chart showing an example of the method for manufacturing an optical display device with the material roll shown in FIG. 6.
Figure 8:
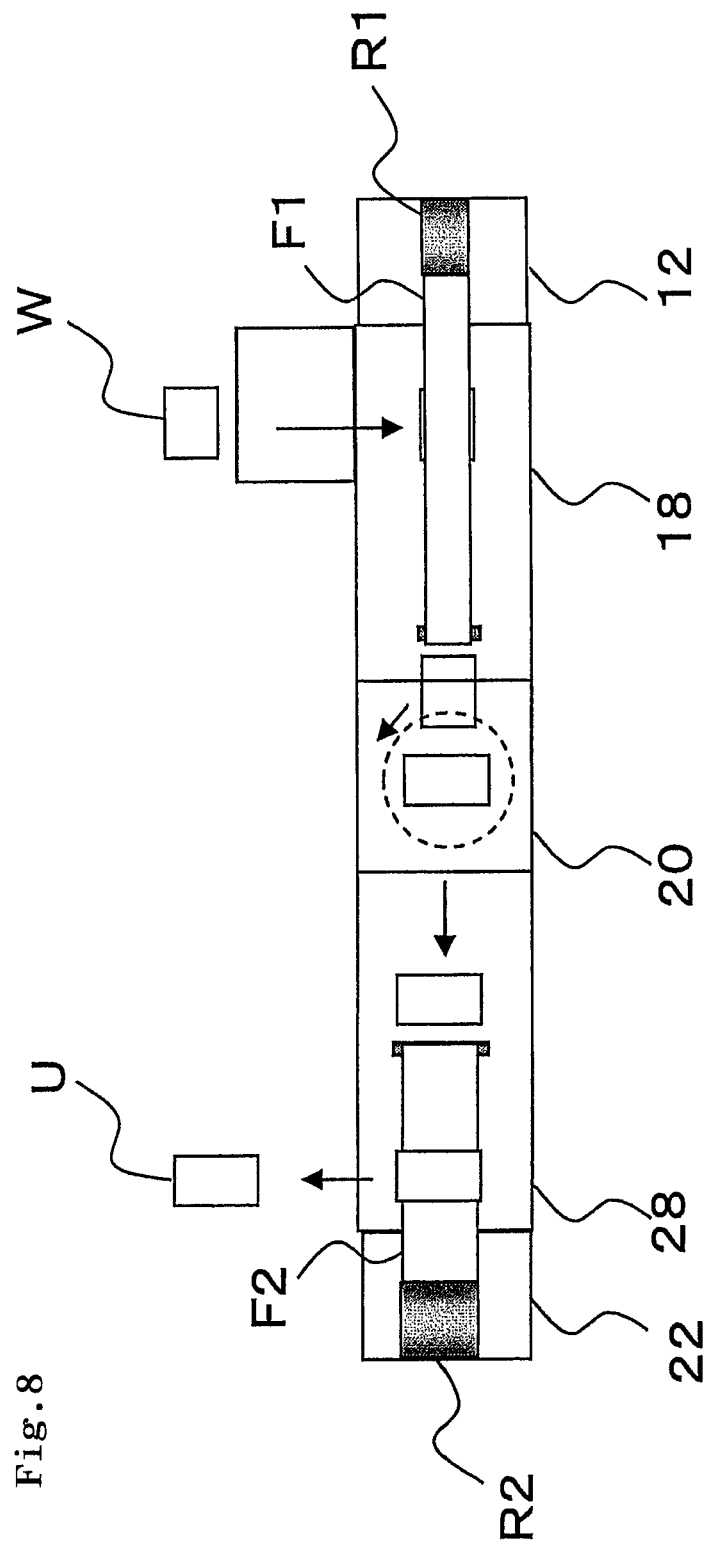
FIG. 8 is a layout plan view showing an example of the system for manufacturing an optical display device with the material roll shown in FIG. 6.

Flow Chart for Manufacture of Optical Display Device Using Material Rolls Having Undergone Half-Cutting FIG. 7 is a flow chart showing an example of the method for manufacturing the optical display device U using the material rolls R1 and R2 shown in FIG. 6. FIG. 8 is a layout plan view showing an example of the system for manufacturing the optical display device U using the material rolls R1 and R2 shown in FIG. 6.

A description is given below of a method for manufacturing the optical display device U including the optical display unit W and the optical films F11 and F21 each including a polarizing film and bonded to the optical display unit W. This embodiment shows a process including a first bonding step and a second bonding step, in which these steps may be performed in any order or may be performed at the same time or substantially at the same time. Alternatively, the optical display device U may be manufactured by bonding an optical film to only one surface of the optical display unit W. In such a case, only one of first and second bonding steps may be performed.

The first bonding step includes drawing the first long sheet material F1 from the first material roll R1 described above, peeling off the first optical film F11, which has previously undergone cutting into a predetermined length, from the first base film F12, and bonding the first optical film F11 to one surface of the optical display unit W. In this embodiment, the predetermined length corresponds to the long side of the optical display unit W.

The second cutting and bonding step includes drawing the second long sheet material F2 from the second material roll R2 described above, peeling off the second optical film F21, which has previously undergone cutting into a predetermined length, from the first base film F22, and bonding the second optical film F21 to the other surface of the optical display unit W. In this embodiment, the predetermined length corresponds to the short side of the optical display unit W.

In a factory, each step described below is preferably performed in an isolated structure with cleanliness maintained. In particular, cleanliness is preferably maintained in the steps of bonding the optical films F11 and F21 to the optical display unit W.

(1) Step of Providing First Material Roll (S101 in FIG. 7). The first long sheet material F1 having undergone half-cutting as described above is provided in the form of the first material roll R1. The core P1 of the first material roll R1 is mounted on a roll mount apparatus that is geared to a motor or the like to rotate freely or at a certain speed.

(2) Feeding Step (S102 in FIG. 7). The first sheet material F1 is fed to the downstream side from the first material roll R1 provided and placed. The first sheet material F1 is fed by a first feeder 12, for example, which includes a pair of nip rollers, a tension roller, a rotary drive, an accumulator, a sensor, a controller, and other components. In this embodiment, the first optical sheet piece F100 composed of the first pressure-sensitive adhesive layer F14, the first optical film F11, the second pressure-sensitive adhesive layer F15, and the second base film F13, which have previously undergone cutting, is formed on the first base film F12 which is left uncut, and the first base film F12 can be used as a carrying medium (carrier film) for the first optical sheet piece F100.

(3) First Bonding Step (S103 in FIG. 7). While the first base film F12 of the first sheet material F1 is peeled off using a first peeling apparatus (not shown), the first optical film F11 separated from the first base film F12 is bonded to the optical display unit W with the first pressure-sensitive adhesive layer F14 interposed therebetween using a first bonding apparatus 18. The first optical sheet piece F100 is bonded to the optical display unit W in the same manner as described above with reference to FIG. 5. Therefore, as shown in FIG. 5, the bonding step includes press-bonding the first optical sheet piece F100 and the optical display unit W together by inserting them between a pair of rolls 181 and 182. The peeling mechanism of the first peeling apparatus has a sharp-ended knife edge 183 and is configured so that the first base film F12 can be peeled off by hooking it on the knife edge 183 and reversing the direction of the feeding and that after the separation of the first base film 12, the first optical sheet piece F100 can be fed from the upper side to one surface of the optical display unit W. The separated first base film F12 is wound around a roll 184. The winding around the roll 184 is controlled by the controller.

(4-1) Cleaning Step (S104-1 in FIG. 7). For example, the surface of the optical display unit W is cleaned using a polishing cleaning apparatus and a water cleaning apparatus. The cleaned optical display unit W is transported to an inspection apparatus by a feeding mechanism. For example, the feeding mechanism includes feed rollers, a feed direction-switching mechanism, a rotary drive, a sensor, a controller, and other components.

(4-2) Inspection Step (S104-2 in FIG. 7). For example, after the cleaning, the surface of the optical display unit W is inspected using an inspection apparatus. After the inspection, the optical display unit W is fed to the first bonding apparatus 18 by the feeding mechanism.

All of the step of providing the first material roll, the first bonding step, the cleaning step, and the inspection step are preferably performed in a continuous manufacturing line. In the above series of manufacturing steps, the first optical film F11 is bonded to one surface of the optical display unit W. A description is given below of manufacturing steps in which the second optical film F21 is bonded to the other surface of the optical display unit W.

(5) Step of Providing Second Material Roll (S111 in FIG. 7). The second long sheet material F2 having undergone half-cutting as described above is provided in the form of the second material roll R2. As in the case of the first material roll R1, the core of the first material roll R2 is mounted on a roll mount apparatus that is geared to a motor or the like to rotate freely or at a certain speed.

(6) Feeding Step (S112 in FIG. 7). The second sheet material F2 is fed to the downstream side from the second material roll R2 provided and placed. The second sheet material F2 is fed by a second feeder 22, for example, which includes a pair of nip rollers, a tension roller, a rotary drive, an accumulator, a sensor, a controller, and other components. In this embodiment, the second optical sheet piece F200 composed of the first pressure-sensitive adhesive layer F24, the second optical film F21, the second pressure-sensitive adhesive layer F25, and the second base film F23, which have previously undergone cutting, is formed on the first base film F22 which is left uncut, and the first base film F22 can be used as a carrying medium (carrier film) for the first optical sheet piece F200.

(7) Second Bonding Step (S113 in FIG. 7). While the first base film F22 of the second sheet material F2 is peeled off using a second peeling apparatus (not shown), the second optical film F21 separated from the first base film F22 is bonded to the other surface of the optical display unit W than the surface, to which the first optical film F11 is bonded, with the first pressure-sensitive adhesive layer F24 interposed therebetween using a second bonding apparatus 28. Before the second optical film F21 is bonded to the optical display unit W, the optical display unit W is turned by 90° using the feed direction-switching mechanism (a turning apparatus 20) of the feeding mechanism so that the first and second optical films F11 and F21 can have a crossed Nicols relationship.

Therefore, the process preferably includes the step of turning the optical display unit W, which has undergone the first bonding step, to the direction of bonding in the second bonding step. The turning step is preferably performed so that the direction of the long side of the first optical film F11 bonded to the optical display unit W can make an angle of 0±5°, preferably 0±1°, with the direction of the long side of the second optical film F21 to be bonded after cutting. For example, when the direction of the first optical film F11-feeding line is parallel to the direction of the second optical film F21-feeding line (including when they are on a straight line), the turning angle in the turning step is preferably from 85° to 95°. Alternatively, however, the turning apparatus 20 may be omitted. In such a case, the feed direction of the first sheet material F1 and the feed direction of the second sheet material F2 may be arranged not parallel but perpendicular to each other.

The configuration of the second bonding apparatus 28 is almost the same as that of the first bonding apparatus 18 described with reference to FIG. 5, but different in that it is configured so that the second optical sheet piece F200 separated from the first base film F22 is fed from the lower side to the other surface of the optical display unit W. There may be provided a mechanism for turning over the optical display unit W after the first optical sheet piece F100 is bonded thereto (turning-over apparatus). In such a case, the second optical sheet piece F200 separated from the first base film F22 may be fed from the upper side to the other surface of the optical display unit W similarly to when the first bonding apparatus 18 is used. The turning-over apparatus may be provided separately from the turning apparatus 20 or integrated with the turning mechanism 20 so that the optical display unit W can be turned and turned over at the same time.

(8) Step of Inspecting Optical Display Device (S114 in FIG. 7). An inspection apparatus is used to inspect the optical display device U after the optical films are bonded. An example of the inspection method is a method of performing imaging and image processing on both sides of the optical display device U with reflected light. Another example of the method uses a polarizing film for inspection placed between a CCD camera and the object to be inspected. Known methods may be used for the image processing algorithm. For example, defects may be detected by gray scale determination based on binarization.

(9) Defect information obtained using the inspection apparatus is used to determine whether the optical display device U is non-defective. The optical display device U determined to be non-defective is transferred to the next implementing step. When determined to be defective, it is subjected to a reworking process, in which a new optical film is bonded, and then the product is inspected. The product determined to be non-defective is transferred to the implementing step, but the product determined to be defective is subjected to the rewording process again or to disposal.

In the above series of manufacturing steps, the first optical film F11 bonding step and the second optical film F21 bonding step may be performed in a continuous manufacturing line, which makes it possible to manufacture the optical display device U in a satisfactory manner.

Another Mode of Roll Materials Having Undergone Half-Cutting

FIG. 9 is a perspective view of material rolls R1 and R2 showing another example of the formation of score lines in the sheet materials F1 and F2. In this example, the sheet materials F1 and F2 each have a portion with score lines formed at an interval corresponding to the long or short side of the optical display unit W and a portion with score lines formed at an interval different from the interval corresponding to the long or short side of the optical display unit W. The portion with the score lines formed at an interval corresponding to the long or short side of the optical display unit W forms the optical sheet piece F100 or F200 of a size corresponding to the optical display unit W, which can be obtained by dividing the sheet material by the score lines and then bonded to the optical display unit W. On the other hand, the portion with score lines formed at an interval different from the interval corresponding to the long or short side of the optical display unit W may be removed without being bonded to the optical display unit W. When the optical display device is manufactured using these material rolls R1 and R2, the first sheet material F1 containing any defect may be removed so as not to be bonded to the optical display unit W using a removal apparatus. Specifically, the steps of feeding the first and second optical films F11 and F21 preferably include a defective portion-removing step in which the portion with score lines formed at an interval different from the interval corresponding to the long or short side of the optical display unit W is removed as a defective portion.

EXAMPLES

Different types of material rolls are described below with respect to the results of the evaluation of lifting of the first base film from the optical film, lifting-induced bonding failure, failure in the peeling of the first base film, the occurrence of corrugating, and failure in the peeling of the second base film. Each material roll used in the evaluation was obtained by a process including bonding first and second base films to first and second surfaces of an optical film, respectively, with pressure-sensitive adhesive layers (with different adhering strengths) interposed therebetween, respectively, to form a sheet material, and winding the sheet material around a core.

Lifting of the first base film from the optical film was visually identified while the sheet material was drawn from the material roll. When at least one lifting occurred in an area of 400 mm wide by 700 mm long, lifting was determined to be present in the area. Under each set of conditions, 100 areas were observed, and the results were evaluated by the number of areas in which lifting was determined to be present.

Lifting-induced bonding failure and the occurrence of corrugating (lamination bubbles) were evaluated as described below. While the long sheet material was drawn from the material roll, the optical films were continuously bonded to non-alkali glass plates (400 mm×700 mm) manufactured by Corning Incorporated to form 32 inch (400 mm×700 mm) film-carrying glass plates. The film-carrying glass plates were assumed as optical display devices (in the examples described below, the film-carrying glass plate is referred to as "optical display device") and visually observed as to the presence or absence of a poor appearance part (a part where light leakage occurred due to unevenness or bubbles). In the visual observation, the glass plate with the optical film bonded thereto and a film for inspection were arranged in a crossed Nicols relationship, and the observation was performed using a backlight. Under each set of conditions, 100 optical display devices were observed, and the results were evaluated by the number of optical display devices that were determined to have a poor appearance part.

The failure in the peeling of the first base film was evaluated by counting how often the failure in peeling off occurred when the process including bonding the optical film to the optical display unit, while peeling off the optical film and the second base film from the first base film was performed 100 times under each set of conditions. More specifically, the case where the adhering strength A was too high, the case where the other components other than the first base film were too thin so that peeling off was not possible, and the case where peeling occurred at any other site than the interface between the first base film and the first pressure-sensitive adhesive layer were evaluated as the failure in peeling off.

The failure in the peeling of the second base film was evaluated by counting how often the second pressure-sensitive adhesive layer was left on the optical film when the process of peeling off the second base film from the prepared optical display device was performed 100 times under each set of conditions.

The results of the evaluation are shown in Table 1 below.

TABLE 1

|  | Thickness (μm) of the part other than the first base film | Adhering strength A (N/25 mm) | Adhering strength B (N/25 mm) | Adhering strength C (N/25 mm) | Adhering strength D (N/25 mm) | Position of the first base film |
|---|---|---|---|---|---|---|
| Example 1 | 276 | 0.15 | 17 | 0.5 | 20 | Outer side |
| Comparative Example 1 | 276 | 0.15 | 17 | 0.5 | 20 | Inner side |
| Example 2 | 276 | 0.1 | 17 | 0.5 | 20 | Outer side |
| Example 3 | 276 | 0.08 | 17 | 0.5 | 20 | Outer side |
| Example 4 | 276 | 0.3 | 17 | 0.5 | 20 | Outer side |
| Comparative Example 2 | 276 | 0.1 | 17 | 0.5 | 20 | Inner side |
| Comparative Example 3 | 276 | 0.05 | 17 | 0.5 | 20 | Inner side |
| Comparative Example 4 | 276 | 0.3 | 17 | 0.5 | 20 | Inner side |
| Comparative Example 5 | 276 | 0.7 | 17 | 0.5 | 20 | Outer side |
| Comparative Example 6 | 276 | 0.3 | 0.15 | 0.5 | 20 | Outer side |
| Comparative Example 7 | 256 | 0.3 | 17 | 0.1 | 20 | Outer side |
| Reference Example | 276 | 0.15 | 17 | 0.5 | 0.25 | Outer side |
| Example 5 | 267 | 0.5 | 17 | 0.8 | 20 | Outer side |
| Example 6 | 256 | 1 | 18 | 1.5 | 20 | Outer side |
| Example 7 | 176.5 | 0.15 | 17 | 0.5 | 20 | Outer side |
| Comparative Example 8 | 176.5 | 0.15 | 17 | 0.5 | 20 | Inner side |
| Example 8 | 176.5 | 0.3 | 17 | 0.5 | 20 | Outer side |

|  | Lifting (the number of areas) | Lifting-induced bonding failure (the number of pieces) | Failure in the peeling of the first base film (the number of times) | Corrugating (the number of pieces) | Failure in the peeling of the second base film (the number of times) |
|---|---|---|---|---|---|
| Example 1 | 0 | 0 | 0 | 0 | 0 |
| Comparative Example 1 | 16 | 16 | 12 | 31 | 0 |
| Example 2 | 0 | 0 | 0 | 0 | 0 |
| Example 3 | 0 | 0 | 0 | 0 | 0 |
| Example 4 | 0 | 0 | 0 | 0 | 0 |
| Comparative Example 2 | 34 | 34 | 9 | 28 | 0 |
| Comparative Example 3 | 49 | 49 | 8 | 29 | 0 |
| Comparative Example 4 | 12 | 12 | 0 | 26 | 0 |
| Comparative Example 5 | 0 | 0 | 27 | 0 | 0 |
| Comparative Example 6 | 0 | — | 100 | — | — |
| Comparative Example 7 | 0 | 0 | 23 | 0 | 0 |
| Reference Example | 0 | 0 | 0 | 0 | 100 |
| Example 5 | 0 | 0 | 1 | 0 | 0 |
| Example 6 | 0 | 0 | 3 | 0 | 7 |
| Example 7 | 0 | 0 | 0 | 0 | 0 |
| Comparative Example 8 | 9 | 9 | 6 | 56 | 0 |
| Example 8 | 0 | 0 | 5 | 0 | 0 |

Example 1

Example 1 was performed using a sheet material composed of: a pressure-sensitive adhesive layer-carrying polarizing film (SEG1423 manufactured by NITTO DENKO CORPORATION) as an optical film; a release liner (MRF38 manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In Example 1, as a result of a 180° peel test on a 25 mm wide sample, the adhering strength A of the first base film-side interface of the first pressure-sensitive adhesive layer was determined to be 0.15 N/25 mm, the adhering strength B of the optical film-side interface of the first pressure-sensitive adhesive layer was determined to be 17 N/25 mm, the adhering strengthadhering strength C of the optical film-side interface of the second pressure-sensitive adhesive layer was determined to be 0.5 N/25 mm, and the adhering strength adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is in the range of 0.075 to 0.4 N/25 mm.

As a result of the evaluation, lifting of the first base film from the optical film was not observed at all. Lifting-induced bonding failure or corrugating was also not observed at all. Failure in the peeling of the first base film or the second base film was also not observed at all.

Comparative Example 1

In Comparative Example 1, the same sheet material as in Example 1 was used, and a material roll was prepared by winding the sheet material in a manner reverse to that in Example 1. Namely, the sheet material was wound in such a manner that the first base film was located on the inner side. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In Comparative Example 1, as a result of a 180° peel test on a 25 mm wide sample, the adhering strength A of the first base film-side interface film-side interface of the first pressure-sensitive adhesive layer was determined to be 0.15 N/25 mm, the adhering strength B of the optical film-side interface film-side interface of the first pressure-sensitive adhesive layer was determined to be 17 N/25 mm, the adhering strength C of the optical film-side interface film-side interface of the second pressure-sensitive adhesive layer was determined to be 0.5 N/25 mm, and the adhering strength D of the second base film-side interface film-side interface of the second pressure-sensitive adhesive layer was determined to be 20 N/25 mm. Therefore, the respective adhering strengths satisfy the relations A<B, A<C<D, and B>C. The adhering strength A is in the range of 0.075 to 0.4 N/25 mm.

As a result of the evaluation, lifting of the first base film from the optical film was observed in 16 out of 100 areas. Lifting-induced bonding failure was observed in 16 out of 100 optical display devices, and corrugating was observed in 31 out of 100 optical display devices. Failure in the peeling of the first base film was also observed in 12 out of 100 bonding operations. Failure in the peeling of the second base film was not observed at all.

Example 2

Example 2 was performed using a sheet material composed of: a pressure-sensitive adhesive layer-carrying polarizing film (SEG1423 manufactured by NITTO DENKO CORPORATION) as an optical film; a release liner (MRB38 manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In Example 2, as a result of a 180° peel test on a 25 mm wide sample, the adhering strength A of the first base film-side interface film-side interface of the first pressure-sensitive adhesive layer was determined to be 0.1 N/25 mm, the adhering strength B of the optical film-side interface film-side interface of the first pressure-sensitive adhesive layer was determined to be 17 N/25 mm, the adhering strength C of the optical film-side interface film-side interface of the second pressure-sensitive adhesive layer was determined to be 0.5 N/25 mm, and the adhering strength D of the second base film-side interface film-side interface of the second pressure-sensitive adhesive layer was determined to be 20 N/25 mm. Therefore, the respective adhering strengths satisfy the relations A<B, A<C<D, and B>C. The adhering strength A is in the range of 0.075 to 0.4 N/25 mm.

As a result of the evaluation, lifting of the first base film from the optical film was not observed at all. Lifting-induced bonding failure or corrugating was also not observed at all. Failure in the peeling of the first base film or the second base film was also not observed at all.

Example 3

Example 3 was performed using a sheet material composed of: a pressure-sensitive adhesive layer-carrying polarizing film (SEG1423 manufactured by NITTO DENKO CORPORATION) as an optical film; a release liner (MRL38 (L01) manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In Example 3, as a result of a 180° peel test on a 25 mm wide sample, the adhering strength A of the first base film-side interface film-side interface of the first pressure-sensitive adhesive layer was determined to be 0.08 N/25 mm, the adhering strength B of the optical film-side interface film-side interface of the first pressure-sensitive adhesive layer was determined to be 17 N/25 mm, the adhering strength C of the optical film-side interface film-side interface of the second pressure-sensitive adhesive layer was determined to be 0.5 N/25 mm, and the adhering strength D of the second base film-side interface film-side interface of the second pressure-sensitive adhesive layer was determined to be 20 N/25 mm. Therefore, the respective adhering strengths satisfy the relations A<B, A<C<D, and B>C. The adhering strength A is in the range of 0.075 to 0.4 N/25 mm.

As a result of the evaluation, lifting of the first base film from the optical film was not observed at all. Lifting-induced bonding failure or corrugating was also not observed at all. Failure in the peeling of the first base film or the second base film was also not observed at all.

Example 4

Example 4 was performed using a sheet material composed of: a pressure-sensitive adhesive layer-carrying polarizing film (SEG1423 manufactured by NITTO DENKO CORPORATION) as an optical film; a release liner (MRL38 (L03) manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In Example 4, as a result of a 180° peel test on a 25 mm wide sample, the adhering strength A of the first base film-side interface film-side interface of the first pressure-sensitive adhesive layer was determined to be 0.3 N/25 mm, the adhering strength B of the optical film-side interface film-side interface of the first pressure-sensitive adhesive layer was determined to be 17 N/25 mm, the adhering strength C of the optical film-side interface film-side interface of the second pressure-sensitive adhesive layer was determined to be 0.5 N/25 mm, and the adhering strength D of the second base film-side interface film-side interface of the second pressure-sensitive adhesive layer was determined to be 20 N/25 mm. Therefore, the respective adhering strengths satisfy the relations A<B, A<C<D, and B>C. The adhering strength A is in the range of 0.075 to 0.4 N/25 mm.

As a result of the evaluation, lifting of the first base film from the optical film was not observed at all. Lifting-induced bonding failure or corrugating was also not observed at all. Failure in the peeling of the first base film or the second base film was also not observed at all.

Comparative Example 2

In Comparative Example 2, the same sheet material as in Example 2 was used, and a material roll was prepared by winding the sheet material in a manner reverse to that in Example 2. Namely, the sheet material was wound in such a manner that the first base film was located on the inner side. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In Comparative Example 2, as a result of a 180° peel test on a 25 mm wide sample, the adhering strength A of the first base film-side interface film-side interface of the first pressure-sensitive adhesive layer was determined to be 0.1 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is in the range of 0.075 to 0.4 N/25 mm.

As a result of the evaluation, lifting of the first base film from the optical film was observed in 34 out of 100 areas. Lifting-induced bonding failure was observed in 34 out of 100 optical display devices, and corrugating was observed in 28 out of 100 optical display devices. Failure in the peeling of the first base film was also observed in 9 out of 100 bonding operations. Failure in the peeling of the second base film was not observed at all.

Comparative Example 3

Comparative Example 3 was performed using a sheet material composed of: a pressure-sensitive adhesive layer-carrying polarizing film (SEG1423 manufactured by NITTO DENKO CORPORATION) as an optical film; a release liner (MRZ38 manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. The sheet material was wound into a roll in such a manner that the first base film was located on the inner side, so that a material roll was obtained. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In Comparative Example 3, as a result of a 180° peel test on a 25 mm wide sample, the adhering strength A of the first base film-side interface of the first pressure-sensitive adhesive layer was determined to be 0.05 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is not in the range of 0.075 to 0.4 N/25 mm.

As a result of the evaluation, lifting of the first base film from the optical film was observed in 49 out of 100 areas. Lifting-induced bonding failure was observed in 49 out of 100 optical display devices, and corrugating was observed in 29 out of 100 optical display devices. Failure in the peeling of the first base film was also observed in 8 out of 100 bonding operations. Failure in the peeling of the second base film was not observed at all.

Comparative Example 4

In Comparative Example 4, the same sheet material as in Example 4 was used, and a material roll was prepared by winding the sheet material in a manner reverse to that in Example 4. Namely, the sheet material was wound in such a manner that the first base film was located on the inner side. The thickness of the optical film including the pressure-sensitive adhesive layer was 208 µm. The thickness of the second base film including the pressure-sensitive adhesive layer was 68 µm. The other part of the sheet material than the first base film had a thickness of 276 µm, which is a normal thickness departing from the range of 50 to 200 µm.

In Comparative Example 4, as a result of a 180° peel test on a 25 mm wide sample, the adhering strength A of the first base film-side interface of the first pressure-sensitive adhesive layer was determined to be 0.3 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is in the range of 0.075 to 0.4 N/25 mm.

As a result of the evaluation, lifting of the first base film from the optical film was observed in 12 out of 100 areas. Lifting-induced bonding failure was observed in 12 out of 100 optical display devices, and corrugating was observed in 26 out of 100 optical display devices. Failure in the peeling of the first base film or the second base film was not observed at all.

Comparative Example 5

Comparative Example 5 was performed using a sheet material composed of: a pressure-sensitive adhesive layer-carrying polarizing film (SEG1423 manufactured by NITTO DENKO CORPORATION) as an optical film; a release liner (MRV50 (V08) manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. The sheet material was wound into a roll in such a manner that the first base film was located on the outer side, so that a material roll was obtained. The thickness of the optical film including the pressure-sensitive adhesive layer was 208 µm. The thickness of the second base film including the pressure-sensitive adhesive layer was 68 µm. The other part of the sheet material than the first base film had a thickness of 276 µm, which is a normal thickness departing from the range of 50 to 200 µm.

In Comparative Example 5, as a result of a 180° peel test on a 25 mm wide sample, the adhering strength A of the first base film-side interface of the first pressure-sensitive adhesive layer was determined to be 0.7 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relations A<B and B>C but do not satisfy the relation A<C<D. The adhering strength A is not in the range of 0.075 to 0.4 N/25 mm.

As a result of the evaluation, failure in the peeling of the first base film was observed in 27 out of 100 bonding operations. Lifting of the first base film from the optical film was not observed at all. Lifting-induced bonding failure or corrugating was also not observed at all. Failure in the peeling of the second base film was also not observed at all.

Comparative Example 6

Comparative Example 6 was performed using a sheet material composed of: a pressure-sensitive adhesive layer-carrying polarizing film (SEG1423 manufactured by NITTO DENKO CORPORATION) as an optical film; a release liner (MRL38 (L03) manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. In the optical film used, there was no undercoat layer between the pressure-sensitive adhesive layer and the polarizing film. The sheet material was wound into a roll in such a manner that the first base film was located on the outer side, so that a material roll was obtained. The thickness of the optical film including the pressure-sensitive adhesive layer was 208 µm. The thickness of the second base film including the pressure-sensitive adhesive layer was 68 µm. The other part of the sheet material than the first base film had a thickness of 276 µm, which is a normal thickness departing from the range of 50 to 200 µm.

In Comparative Example 6, as a result of a 180° peel test on a 25 mm wide sample, the adhering strength A of the first base film-side interface of the first pressure-sensitive adhesive layer was determined to be 0.3 N/25 mm, the adhering strength B of the optical film-side interface of the first pressure-sensitive adhesive layer was determined to be 0.15 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relation A<C<D but satisfy neither the relation A<B nor B>C. The adhering strength A is in the range of 0.075 to 0.4 N/25 mm.

As a result of the evaluation, failure in the peeling of the first base film was observed in all of 100 bonding operations. Lifting of the first base film from the optical film was not observed at all. The first base film and the first pressure-sensitive adhesive layer were peeled off together from the optical film, so that the optical film was not able to be bonded to the optical display unit with the first pressure-sensitive adhesive layer interposed therebetween. Therefore, lifting-induced bonding failure or corrugating was not able to be evaluated. Since the optical film was not able to be bonded to the optical display unit to form an optical display device, failure in the peeling of the second base film was also not able to be evaluated.

Comparative Example 7

Comparative Example 7 was performed using a sheet material composed of: a pressure-sensitive adhesive layer-carrying polarizing film (SEG1423 manufactured by NITTO DENKO CORPORATION) as an optical film; a release liner (MRL38 (L03) manufactured by Mitsubishi Plastics Inc.) bonded as a first base film to the pressure-sensitive adhesive layer of the above; and a pressure-sensitive adhesive layer-carrying surface protecting film (RP107F manufactured by NITTO DENKO CORPORATION) bonded as a second base film to the opposite surface of the polarizing film from the above pressure-sensitive adhesive layer. The second base film side surface of the optical film was subjected to a silicone treatment so that the adhering strength C could be the value below. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 48 μm. The other part of the sheet material than the first base film had a thickness of 256 μm, which is a normal thickness departing from the range of 50 to 200 μm.

In Comparative Example 7, as a result of a 180° peel test on a 25 mm wide sample, the adhering strength A of the first base film-side interface of the first pressure-sensitive adhesive layer was determined to be 0.3 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.1 N/25 mm, and the adhering strength D of the second base film-side interface of the second pressure-sensitive adhesive layer was determined to be 20 N/25 mm. Therefore, the respective adhering strengths satisfy the relations A<B and B>C but do not satisfy the relation A<C<D. The adhering strength A is in the range of 0.075 to 0.4 N/25 mm.

As a result of the evaluation, failure in the peeling of the first base film was observed in 23 out of 100 bonding operations. Lifting of the first base film from the optical film was not observed at all. Lifting-induced bonding failure or corrugating was also not observed at all. Failure in the peeling of the second base film was also not observed at all.

Reference Example

Reference Example was performed using a sheet material composed of: a pressure-sensitive adhesive layer-carrying polarizing film (SEG1423 manufactured by NITTO DENKO CORPORATION) as an optical film; a release liner (MRF38 manufactured by Mitsubishi Plastics Inc.) bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the polarizing film from the above pressure-sensitive adhesive layer. The second base film was subjected to a corona treatment so that the pressure-sensitive adhesive layer formed could have an adhering strength D of the value below. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 68 μm. The other part of the sheet material than the first base film had a thickness of 276 μm, which is a normal thickness departing from the range of 50 to 200 μm.

In this reference example, as a result of a 180° peel test on a 25 mm wide sample, the adhering strength A of the first base film-side interface of the first pressure-sensitive adhesive layer was determined to be 0.15 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 0.25 N/25 mm. Therefore, the respective adhering strengths satisfy the relations A<B and B>C but do not satisfy the relation A<C<D. The adhering strength A is in the range of 0.075 to 0.4 N/25 mm.

As a result of the evaluation, failure in the peeling of the second base film was observed in all of 100 bonding operations. Lifting of the first base film from the optical film was not observed at all. Lifting-induced bonding failure or corrugating was also not observed at all. Failure in the peeling of the first base film was also not observed at all.

Example 5

Example 5 was performed using a sheet material composed of: a pressure-sensitive adhesive layer-carrying polarizing film (SEG1423 manufactured by NITTO DENKO CORPORATION) as an optical film; a release liner (MRV38 (V04) manufactured by Mitsubishi Plastics Inc.) bonded as a first base film to the pressure-sensitive adhesive layer of the above; and a pressure-sensitive adhesive layer-carrying surface protecting film (RP207 manufactured by NITTO DENKO CORPORATION) bonded as a second base film to the opposite surface of the polarizing film from the above pressure-sensitive adhesive layer. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 59 μm. The other part of the sheet material than the first base film had a thickness of 267 μm, which is a normal thickness departing from the range of 50 to 200 μm.

In Example 5, as a result of a 180° peel test on a 25 mm wide sample, the adhering strength A of the first base film-side interface of the first pressure-sensitive adhesive layer was determined to be 0.5 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.8 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is not in the range of 0.075 to 0.4 N/25 mm.

As a result of the evaluation, failure in the peeling of the first base film was observed in only one out of 100 bonding operations. Lifting of the first base film from the optical film was not observed at all. Lifting-induced bonding failure or corrugating was also not observed at all. Failure in the peeling of the second base film was also not observed at all.

Example 6

Example 6 was performed using a sheet material composed of: a pressure-sensitive adhesive layer-carrying polarizing film (SEG1423 manufactured by NITTO DENKO CORPORATION) as an optical film; a release liner (MRF38 manufactured by Mitsubishi Plastics Inc.) bonded as a first base film to the pressure-sensitive adhesive layer of the above; and a pressure-sensitive adhesive layer-carrying surface protecting film (RP107F manufactured by NITTO DENKO CORPORATION) bonded as a second base film to the opposite surface of the polarizing film from the above pressure-sensitive adhesive layer. The pressure-sensitive adhesive layer of the optical film was subjected to a heat treatment at 60° C. for 120 hours, while the first base film was placed thereon. The sheet material was wound into a roll in such a manner that the first base film was located on the outer side, so that a material roll was obtained. The thickness of the optical film including the pressure-sensitive adhesive layer was 208 μm. The thickness of the second base film including the pressure-sensitive adhesive layer was 48 μm. The other part of the sheet material than the first base film had a thickness of 256 μm, which is a normal thickness departing from the range of 50 to 200 μm.

In Example 6, as a result of a 180° peel test on a 25 mm wide sample, the adhering strength A of the first base film-side interface of the first pressure-sensitive adhesive layer was determined to be 1 N/25 mm, the adhering strength B of the optical film-side interface of the first pressure-sensitive adhesive layer was determined to be 18 N/25 mm, the adhering strength C of the optical film-side interface of the second pressure-sensitive adhesive layer was determined to be 1.5 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is not in the range of 0.075 to 0.4 N/25 mm.

As a result of the evaluation, failure in the peeling of the first base film was observed in only 3 out of 100 bonding operations, and failure in the peeling of the second base film was observed in only 7 of 100 bonding operations. Lifting of the first base film from the optical film was not observed at all. Lifting-induced bonding failure or corrugating was also not observed at all.

Example 7

In Example 7, an optical film was prepared as described below. Amorphous polyethylene terephthalate (A-PET) resin was extruded into a 200 μm thick base material by a T-die method at a forming temperature of 270° C. An aqueous solution (10% in solid content) of polyvinyl alcohol resin (Gosenol NH-18 (trade name) manufactured by Nippon Synthetic Chemical Industry Co., Ltd.) was applied to the base material so that a 10 μm thick coating could be formed after drying. The coating on the base material was uniaxially stretched 3.3 times in the longitudinal direction at 100° C. using a roll stretching machine, so that a laminate of the base material and a polyvinyl alcohol film formed thereon was obtained. While the laminate was fed, it was sequentially immersed in four baths under the conditions [1] to [4] below so that swelling, dyeing, crosslinking, and washing processes were performed on the polyvinyl alcohol film. As a result, a laminate comprising the base material and an iodine-dyed polyvinyl alcohol film (polarizer) formed thereon was obtained.

[1] Swelling bath: immersion in pure water at 28° C. for 120 seconds;
[2] Dyeing bath: immersion in an aqueous solution containing 100 parts by weight of water, 1 part by weight of iodine, and 10 parts by weight of potassium iodide at 30° C. for 60 seconds;
[3] Crosslinking bath: immersion in an aqueous solution containing 100 parts by weight of water and 7.5 parts by weight of boric acid at 60° C. for 300 seconds;
[4] Washing bath: immersion in pure water for 10 seconds.

A triacetylcellulose film (KC4UYW (trade name) manufactured by Konica Minolta, 40 μm in thickness) was bonded to the polarizer-side main surface of the laminate with a polyvinyl alcohol-based adhesive and dried at 50° C. Subsequently, the polyethylene terephthalate film used as the base material was peeled off from the laminate, and a triacetylcellulose film (KC4UYW (trade name) manufactured by Konica Minolta, 40 μm in thickness) was bonded to the exposed surface of the polarizer with a polyvinyl alcohol-based adhesive and dried at 50° C. A release liner (MRF38 manufactured by Mitsubishi Plastics Inc.) was bonded as a first base film to the pressure-sensitive adhesive layer of the resulting pressure-sensitive adhesive layer-carrying optical film, and a pressure-sensitive adhesive layer-carrying surface protecting film (RP206 manufactured by NITTO DENKO CORPORATION) was bonded as a second base film to the opposite surface of the optical film from the pressure-sensitive adhesive layer to form the sheet material to be used. The sheet material was wound into a roll in such a manner that the first base film was located on the outer side, so that a material roll was obtained. The thickness of the optical film including the pressure-sensitive adhesive layer was 108.5 μm. The thickness of the second base film including the pressure-sensitive adhesive layer was 68 μm. The other part of the sheet material than the first base film had a thickness of 176.5 μm. Therefore, the sheet material is a thin film with a thickness in the range of 50 to 200 μm.

In Example 7, as a result of a 180° peel test on a 25 mm wide sample, the adhering strength A of the first base film-side interface of the first pressure-sensitive adhesive layer was determined to be 0.15 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is in the range of 0.01 to 0.19 N/25 mm.

As a result of the evaluation, lifting of the first base film from the optical film was not observed at all. Lifting-induced bonding failure or corrugating was also not observed at all. Failure in the peeling of the first base film or the second base film was also not observed at all.

Comparative Example 8

In Comparative Example 8, the same sheet material as in Example 7 was used, and a material roll was prepared by winding the sheet material in a manner reverse to that in Example 7. Namely, the sheet material was wound in such a manner that the first base film was located on the inner side. The thickness of the optical film including the pressure-sensitive adhesive layer was 108.5 μm. The thickness of the second base film including the pressure-sensitive adhesive layer was 68 μm. The other part of the sheet material than the first base film had a thickness of 176.5 μm. Therefore, the sheet material is a thin film with a thickness in the range of 50 to 200 μm.

In Comparative Example 8, as a result of a 180° peel test on a 25 mm wide sample, the adhering strength A of the first base film-side interface of the first pressure-sensitive adhesive layer was determined to be 0.15 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is in the range of 0.01 to 0.19 N/25 mm.

As a result of the evaluation, lifting of the first base film from the optical film was observed in 9 out of 100 areas. Lifting-induced bonding failure was observed in 9 out of 100 optical display devices, and corrugating was observed in 56 out of 100 optical display devices. Failure in the peeling of the first base film was also observed in 6 out of 100 bonding operations. Failure in the peeling of the second base film was not observed at all.

Example 8

Example 8 was performed using a sheet material composed of: a pressure-sensitive adhesive layer-carrying optical film prepared in the same manner as in Example 7; a release liner (MRL38 (L03) manufactured by Mitsubishi Plastics Inc.) was bonded as a first base film to the pressure-sensitive adhesive layer of the above; and a pressure-sensitive adhesive layer-carrying surface protecting film (RP206 manufactured by NITTO DENKO CORPORATION) bonded as a second base film to the opposite surface of the optical film from the pressure-sensitive adhesive layer. The sheet material was wound into a roll in such a manner that the first base film was located on the outer side, so that a material roll was obtained. The thickness of the optical film including the pressure-sensitive adhesive layer was 108.5 μm. The thickness of the second base film including the pressure-sensitive adhesive layer was 68 μm. The other part of the sheet material than the first base film had a thickness of 176.5 μm. Therefore, the sheet material is a thin film with a thickness in the range of 50 to 200 μm.

In Example 8, as a result of a 180° peel test on a 25 mm wide sample, the adhering strength A of the first base film-side interface of the first pressure-sensitive adhesive layer was determined to be 0.3 N/25 mm, the adhering strength B of the optical film-side interface of the first pressure-sensitive adhesive layer was determined to be 17 N/25 mm, the adhering strength C of the optical film-side interface of the second pressure-sensitive adhesive layer was determined to be 0.5 N/25 mm, and the adhering strength D of the second base film-side interface of the second pressure-sensitive adhesive layer was determined to be 20 N/25 mm. Therefore, the respective adhering strengths satisfy the relations A<B, A<C<D, and B>C. The adhering strength A is not in the range of 0.01 to 0.19 N/25 mm.

As a result of the evaluation, failure in the peeling of the first base film was observed in only 5 out of 100 bonding operations. Lifting of the first base film from the optical film was not observed at all. Lifting-induced bonding failure or corrugating was also not observed at all. Failure in the peeling of the second base film was also not observed at all.

What is claimed is:

1. A method for manufacturing an optical display device using a material roll by bonding an optical film to a surface of an optical display unit, comprising:
   a cutting and bonding step comprising cutting at least the optical film of a sheet material drawn from the material roll into a predetermined length and bonding a cut piece of the optical film to a surface of the optical display unit,
   wherein the material roll comprises a roll of the sheet material comprising the optical film having a first surface and a second surface, a first base film provided on the first surface of the optical film with a first pressure-sensitive adhesive layer interposed therebetween, and a second base film provided on the second surface of the optical film with a second pressure-sensitive adhesive layer interposed therebetween, wherein
   the sheet material has a width corresponding to the length of any one side of the optical display unit,
   adhering strengths A, B, C, and D satisfy relationships A<B and A<C<D, when the first pressure-sensitive adhesive layer has a first base film-side interface with an adhering strength A, the first pressure-sensitive adhesive layer has an optical film-side interface with an adhering strength B, the second pressure-sensitive adhesive layer has an optical film-side interface with an adhering strength C, and the second pressure-sensitive adhesive layer has an second base film-side interface with an adhering strength D,
   the sheet material is wound in such a manner that the first base film is located on an outer side and that the second base film is located on an inner side, and
   the optical film comprises a laminated film comprising at least one of a polarizing film, a retardation film, and a brightness enhancement film.

2. A method according to claim 1, wherein the adhering strengths B and C satisfy the relation B>C.

3. A method according to claim 1 or 2, wherein the sheet material is obtained by a slitting process comprising slitting a material in a direction parallel to its longitudinal direction into a width corresponding to the length of any one side of the optical display unit, while unwinding the material.

4. A method according to claim 3, wherein the optical film in the material comprises a polarizing film, and the material has a longitudinal direction parallel to an absorption axis of the polarizing film.

5. A method according to claim 1, which is for use in a process comprising bonding the optical film to the surface of the optical display unit, while peeling off the optical film and the second base film from the first base film.

6. A method according to claim 5, wherein the adhering strength A is from 0.075 N/25 mm to 0.4 N/25 mm.

7. A method according to claim 1, wherein the other part of the sheet material than the first base film has a thickness of 50 μm to 200 μm.

8. A method according to claim 7, wherein the adhering strength A is from 0.01 N/25 mm to 0.19 N/25 mm.

* * * * *